United States Patent
Kamata

(10) Patent No.: US 11,423,681 B2
(45) Date of Patent: Aug. 23, 2022

(54) IMAGE PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Yutaro Kamata, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 275 days.

(21) Appl. No.: 15/876,332

(22) Filed: Jan. 22, 2018

(65) Prior Publication Data
US 2018/0218206 A1    Aug. 2, 2018

(30) Foreign Application Priority Data

Jan. 30, 2017    (JP) .............................. JP2017-014517

(51) Int. Cl.
*G06V 30/40* (2022.01)
*H04N 1/32* (2006.01)
(Continued)

(52) U.S. Cl.
CPC .............. *G06V 30/40* (2022.01); *G06F 40/10* (2020.01); *G06V 30/412* (2022.01); *H04N 1/32106* (2013.01)

(58) Field of Classification Search
CPC ................. G06F 17/21; G06K 9/00442; G06K 9/00449; H04N 1/32106
See application file for complete search history.

(56) References Cited

U.S. PATENT DOCUMENTS 6,462,778 B1 *  10/2002  Abram ............... H04N 1/00323
                                                            348/239
6,885,481 B1 *   4/2005  Dawe ................. G06V 30/1444
                                                            358/403
(Continued)

FOREIGN PATENT DOCUMENTS

CN          101207689 A        6/2008
CN          105847632 A        8/2016
(Continued)

OTHER PUBLICATIONS

Office Action issued in Chinese Appln. No. 201810084481.7 dated Sep. 4, 2019. English translation provided.
(Continued)

*Primary Examiner* — Gandhi Thirugnanam
(74) *Attorney, Agent, or Firm* — Rossi, Kimms & McDowell LLP

(57) ABSTRACT

An image processing apparatus obtains image data obtained by reading an original, specifies a type of the original using obtained image data, and displays, on a display unit, character strings used for a name of a file of the obtained image data, as selectable candidates of character strings. When a user selects a character string of the candidates of character strings among the candidates of character strings, the image processing apparatus sets the selected character string as a character string used for the name of the file of the image data. The candidates of the character strings displayed on the display unit are selected in accordance with the specified type of the original.

15 Claims, 20 Drawing Sheets

(51) Int. Cl.
*G06F 40/10* (2020.01)
*G06V 30/412* (2022.01)

(56) References Cited

U.S. PATENT DOCUMENTS

| | | | | |
|---|---|---|---|---|
| 7,228,010 | B1* | 6/2007 | Ghosh | G06F 16/10 |
| | | | | 382/305 |
| 8,107,130 | B2* | 1/2012 | Sawaguchi | G06F 16/51 |
| | | | | 358/403 |
| 8,471,925 | B2* | 6/2013 | Chu | H04N 9/8233 |
| | | | | 348/231.2 |
| 8,558,919 | B2* | 10/2013 | Bos | G10L 15/26 |
| | | | | 348/231.2 |
| 9,128,939 | B2* | 9/2015 | Kinsella | G06F 16/164 |
| 9,641,715 | B2 | 5/2017 | Shimazaki | |
| 2004/0230966 | A1* | 11/2004 | Morris | G06F 16/10 |
| | | | | 717/169 |
| 2005/0063009 | A1* | 3/2005 | Ehara | G06F 16/5846 |
| | | | | 707/E17.022 |
| 2006/0050302 | A1* | 3/2006 | Sawaguchi | G06F 16/51 |
| | | | | 358/1.15 |
| 2006/0143154 | A1* | 6/2006 | Jager | G06V 30/416 |
| 2006/0290789 | A1* | 12/2006 | Ketola | G06F 16/93 |
| | | | | 386/E5.072 |
| 2007/0144333 | A1* | 6/2007 | Kawabata | G10H 1/0066 |
| | | | | 84/609 |
| 2010/0215272 | A1* | 8/2010 | Isaev | G06V 30/416 |
| | | | | 382/229 |
| 2012/0023063 | A1* | 1/2012 | Fenton | G06F 40/143 |
| | | | | 707/E17.008 |
| 2012/0050568 | A1* | 3/2012 | Tsujii | H04N 5/907 |
| | | | | 348/231.2 |
| 2012/0124079 | A1* | 5/2012 | Kinsella | G06F 16/487 |
| | | | | 707/769 |
| 2012/0173523 | A1* | 7/2012 | Cheung | G06Q 50/18 |
| | | | | 707/736 |
| 2013/0054595 | A1* | 2/2013 | Isaev | G06V 30/416 |
| | | | | 707/736 |
| 2014/0093170 | A1* | 4/2014 | Ohguro | G06K 9/78 |
| | | | | 382/176 |
| 2014/0122479 | A1* | 5/2014 | Panferov | G06F 3/0643 |
| | | | | 707/736 |
| 2015/0062660 | A1* | 3/2015 | Kato | G06F 16/164 |
| | | | | 358/403 |
| 2016/0227066 | A1* | 8/2016 | Shimazaki | H04N 1/4413 |
| 2018/0084138 | A1* | 3/2018 | Washington | H04N 1/00811 |
| 2018/0218206 | A1* | 8/2018 | Kamata | G06F 40/10 |
| 2018/0349414 | A1* | 12/2018 | Morita | G06F 16/5846 |
| 2020/0293810 | A1* | 9/2020 | Kanada | G06V 30/153 |
| 2020/0358915 | A1* | 11/2020 | Kawasaki | G06V 30/414 |

FOREIGN PATENT DOCUMENTS

| | | |
|---|---|---|
| JP | 2006072892 A | 3/2006 |
| JP | 2009205325 A | 9/2009 |
| JP | 2016143165 A | 8/2016 |
| JP | 2019153919 A * | 9/2019 |

OTHER PUBLICATIONS

Office Action issued in Japanese Appln. No. 2017-014517 dated Oct. 9, 2020.

* cited by examiner

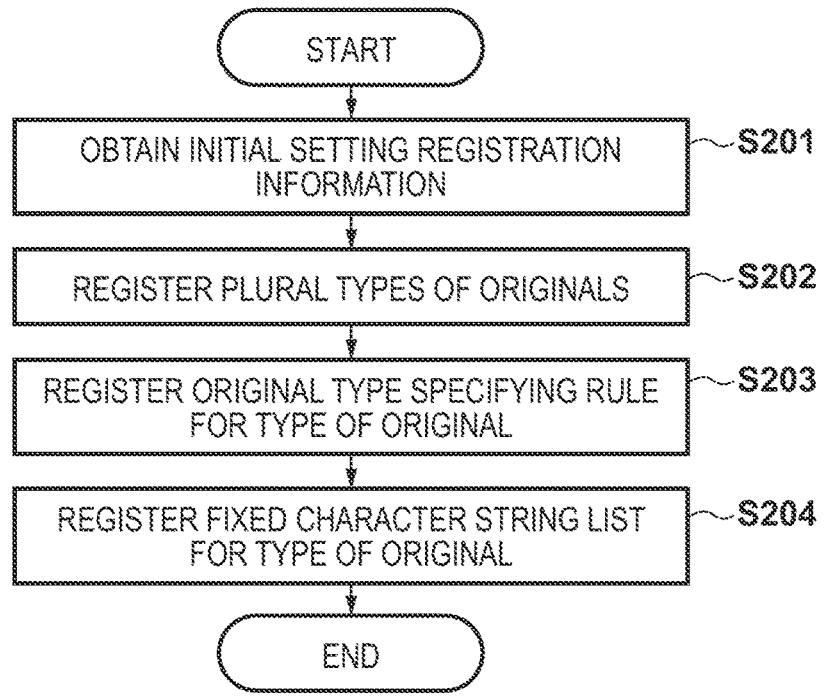
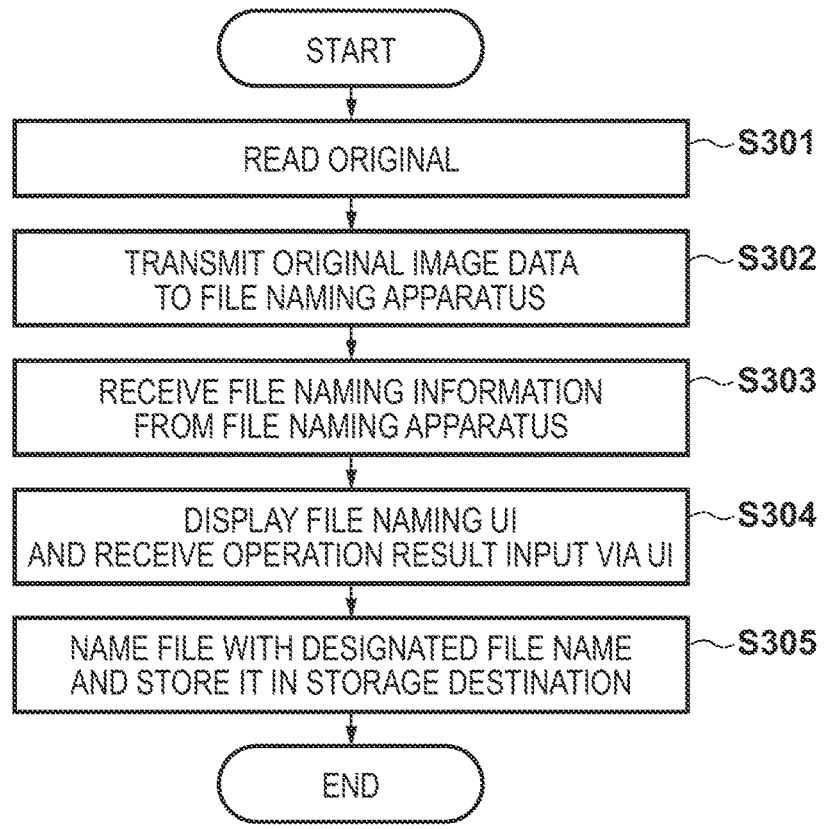

F I G. 5B

507 — ORDER SHEET

501 — ORDER SHEET

NOVEMBER 1, 2015

TO: NISHITORIDE HAKUSAN & CO.

WE WOULD LIKE TO ORDER YOUR PRODUCTS AS FOLLOWS.

ORDER NUMBER 123456 9

DELIVERY DATE: OCTOBER 25, 2015

| No |  | QUANTITY | UNIT PRICE | AMOUNT |
|---|---|---|---|---|
| 1 | PRODUCT/MERCHANDISE/MATERIAL NAME 1 | 10 | 500 | 5,000 |
| 2 | PRODUCT/MERCHANDISE/MATERIAL NAME 2 | 100 | 11,000 | ######## |
| 3 | PRODUCT/MERCHANDISE/MATERIAL NAME 1 | 200 | 500 | 100,000 |
| 4 | PRODUCT/MERCHANDISE/MATERIAL NAME 3 | 10 | 10,000 | 100,000 |
| 5 | PRODUCT/MERCHANDISE/MATERIAL NAME 4 | 20 | 13,000 | 260,000 |
| 6 | PRODUCT/MERCHANDISE/MATERIAL NAME 5 | 50 | 14,000 | 700,000 |
| 7 | PRODUCT/MERCHANDISE/MATERIAL NAME 8 | 20 | 17,000 | 340,000 |
| 8 | PRODUCT/MERCHANDISE/MATERIAL NAME 9 | 30 | 18,000 | 540,000 |
| 9 | PRODUCT/MERCHANDISE/MATERIAL NAME 11 | 40 | 20,000 | 800,000 |
| 10 | PRODUCT/MERCHANDISE/MATERIAL NAME 12 | 10 | 21,000 | 210,000 |
| 11 | PRODUCT/MERCHANDISE/MATERIAL NAME 15 | 30 | 24,000 | 720,000 |
| 12 |  |  |  |  |
| 13 |  |  |  |  |
| 14 |  |  |  |  |

502 — ORDER SHEET
503 — TEMPLATE
504 — PROCESSING STANDBY
505 — APPROVED 1  2  3  4

508 — DECISION

FIG. 6A

ORDER_SHEET_PROCESSING STANDBY — 507

502 ORDER SHEET
503 TEMPLATE
504 PROCESSING STANDBY
505 APPROVED
506: 1 2 3 4
508 DECISION

ORDER SHEET — 501

NOVEMBER 1, 2015

ORDER NUMBER 123456 9

TO: NISHITORIDE HAKUSAN & CO.

WE WOULD LIKE TO ORDER YOUR PRODUCTS AS FOLLOWS.

DELIVERY DATE: OCTOBER 25, 2015

| No | | QUANTITY | UNIT PRICE | AMOUNT |
|---|---|---|---|---|
| 1 | PRODUCT/MERCHANDISE/MATERIAL NAME 1 | 10 | 500 | 5,000 |
| 2 | PRODUCT/MERCHANDISE/MATERIAL NAME 2 | 100 | 11,000 | ####### |
| 3 | PRODUCT/MERCHANDISE/MATERIAL NAME 1 | 200 | 500 | 100,000 |
| 4 | PRODUCT/MERCHANDISE/MATERIAL NAME 3 | 10 | 10,000 | 100,000 |
| 5 | PRODUCT/MERCHANDISE/MATERIAL NAME 4 | 20 | 13,000 | 260,000 |
| 6 | PRODUCT/MERCHANDISE/MATERIAL NAME 5 | 50 | 14,000 | 700,000 |
| 7 | PRODUCT/MERCHANDISE/MATERIAL NAME 8 | 20 | 17,000 | 340,000 |
| 8 | PRODUCT/MERCHANDISE/MATERIAL NAME 9 | 30 | 18,000 | 540,000 |
| 9 | PRODUCT/MERCHANDISE/MATERIAL NAME 11 | 40 | 20,000 | 800,000 |
| 10 | PRODUCT/MERCHANDISE/MATERIAL NAME 12 | 10 | 21,000 | 210,000 |
| 11 | PRODUCT/MERCHANDISE/MATERIAL NAME 15 | 30 | 24,000 | 720,000 |
| 12 | | | | |
| 13 | | | | |
| 14 | | | | |

FIG. 6B

507 — FILE NAME...

502 INVOICE
503 ASSOCIATE COMPANIES
504 RECEIVED
505 UNBILLED 1 2 3 4

508 DECISION

501

INVOICE NUMBER 5672

FROM: TOKYO TORIDE KK
JIRO JYOBAN
TEL 0297-00-0000

TO: TOKYO KK

INVOICE FOR JANUARY 2016

THANK YOU VERY MUCH FOR YOUR CONTINUED SUPPORT.
PLEASE BE ADVISED THAT YOUR PAYMENT IS LISTED BELOW.
THANK YOU FOR YOUR COOPERATION.

| BALANCE CARRIED FORWARD | PAYMENT | CURRENT MONTH PURCHASE WITHOUT TAX | CON- SUMPTION TAX | CURRENT MONTH SALES | TOTAL AMOUNT |
|---|---|---|---|---|---|
| 0 | 0 | 400,000 | 32,000 | 432,000 | 432,000 |

| DATE | ITEM | UNIT PRICE | QUANTITY | AMOUNT |
|---|---|---|---|---|
| DECEMBER 10 | PURCHASED ITEMS | 80,000 | 5 | 400,000 |

FIG. 7

ORDER SHEET

NOVEMBER 1, 2015

TO: NISHITORIDE HAKUSAN & CO.

WE WOULD LIKE TO ORDER
YOUR PRODUCTS AS FOLLOWS.
   DELIVERY DATE: OCTOBER 25, 2015

ORDER NUMBER 123456 987

| No | | QUANTITY | UNIT PRICE | AMOUNT | REMARKS |
|---|---|---|---|---|---|
| 1 | PRODUCT/MERCHANDISE/MATERIAL NAME 1 | 10 | 500 | 5,000 | |
| 2 | PRODUCT/MERCHANDISE/MATERIAL NAME 2 | 100 | 11,000 | ###### | |
| 3 | PRODUCT/MERCHANDISE/MATERIAL NAME 1 | 200 | 500 | 100,000 | |
| 4 | PRODUCT/MERCHANDISE/MATERIAL NAME 3 | 10 | 10,000 | 100,000 | |
| 5 | PRODUCT/MERCHANDISE/MATERIAL NAME 4 | 20 | 13,000 | 260,000 | |
| 6 | PRODUCT/MERCHANDISE/MATERIAL NAME 5 | 50 | 14,000 | 700,000 | |
| 7 | PRODUCT/MERCHANDISE/MATERIAL NAME 8 | 20 | 17,000 | 340,000 | |
| 8 | PRODUCT/MERCHANDISE/MATERIAL NAME 9 | 30 | 18,000 | 540,000 | |
| 9 | PRODUCT/MERCHANDISE/MATERIAL NAME 11 | 40 | 20,000 | 800,000 | |
| 10 | PRODUCT/MERCHANDISE/MATERIAL NAME 12 | 10 | 21,000 | 210,000 | |
| 11 | PRODUCT/MERCHANDISE/MATERIAL NAME 15 | 30 | 24,000 | 720,000 | |
| 12 | | | | | |
| 13 | | | | | |
| 14 | | | | | |
| 15 | | | | | |
| 16 | | | | | |
| 17 | | | | | |
| 18 | | | | | |
| 19 | | | | | |
| 20 | | | | | |
| TOTAL AMOUNT (INCLUDING TAX) | | | | 4,875,000 | |

| ISSUER | VERIFIER |
|---|---|
| | |

〒111-1111 IBARAKI-KEN TORIDE-SHI TORIDE
   TORIDE & CO.
   REPRESENTATIVE DIRECTOR TARO IBARAKI
TEL. 1111-11-1111 FAX 1111-11-1111

FIG. 8

TO: TOKYO KK

INVOICE NUMBER 5672

FROM: TOKYO TORIDE KK
JIRO JYOBAN
TEL 0297-00-0000

INVOICE FOR JANUARY 2016

THANK YOU VERY MUCH FOR YOUR CONTINUED SUPPORT.
PLEASE BE ADVISED THAT YOUR PAYMENT IS LISTED BELOW.
THANK YOU FOR YOUR COOPERATION.

| BALANCE CARRIED FORWARD | PAYMENT | CURRENT MONTH PURCHASE WITHOUT TAX | CONSUMPTION TAX | CURRENT MONTH SALES | TOTAL AMOUNT |
|---|---|---|---|---|---|
| 0 | 0 | 400,000 | 32,000 | 432,000 | 432,000 |

| DATE | ITEM | UNIT PRICE | QUANTITY | AMOUNT |
|---|---|---|---|---|
| DECEMBER 10 | PURCHASED ITEMS | 80,000 | 5 | 400,000 |
| | | | | |
| | | | | |
| | | | | |
| | | | | |
| | | | | |
| | | | | |
| | | | | |
| | TOTAL | | | 400,000 |

PLEASE HAVE YOUR COMPANY BEAR THE BANK TRANSFER SERVICE FEES.
PAYMENT DEADLINE: JANUARY 31, 2016
※ WHEN THERE IS NO PAYMENT BY THE DUE DATE, IN ADDITION TO THE ABOVE, YOU MAY BE ASKED TO DELAY INTEREST PAYMENT.

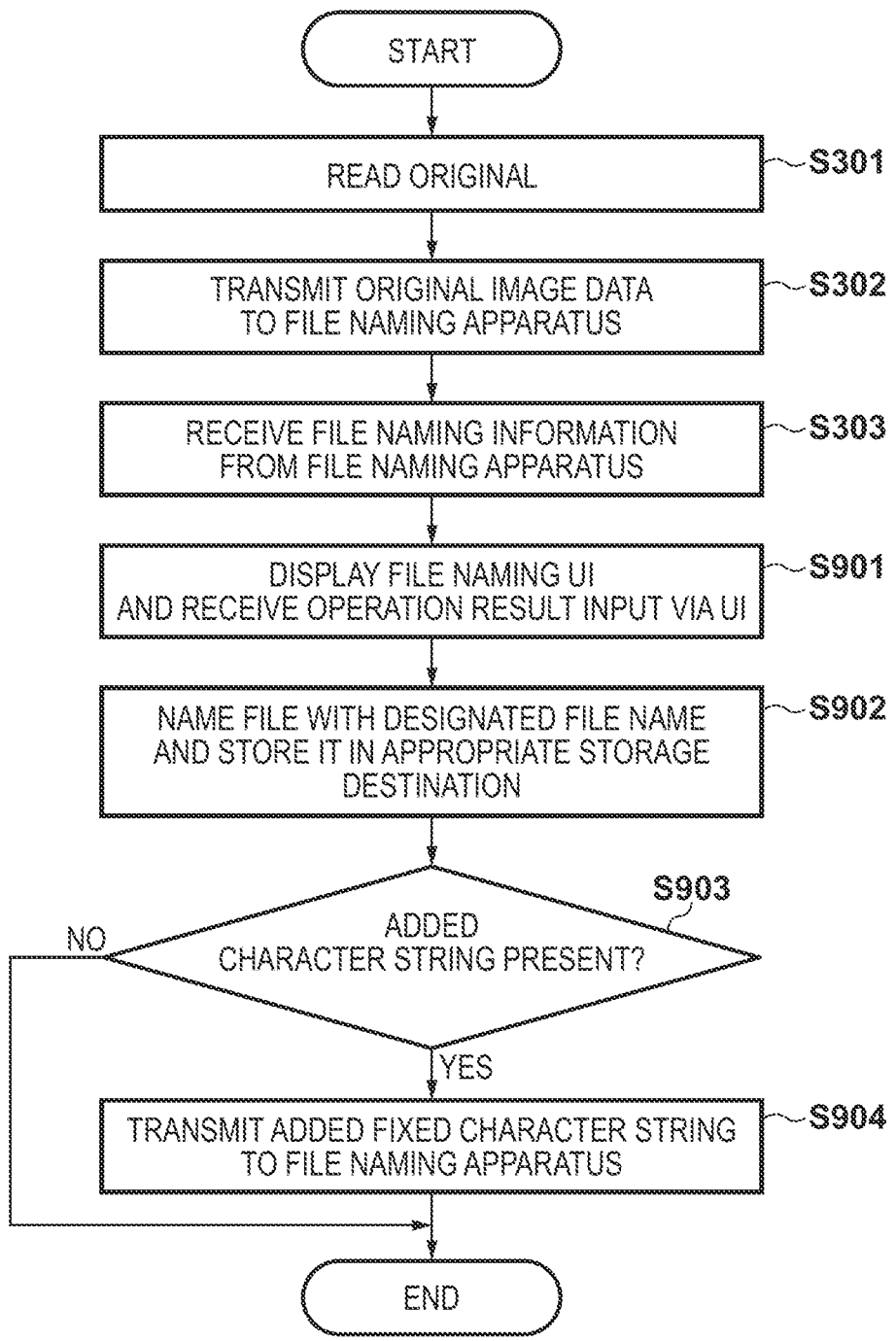

FIG. 11B

ORDER SHEET

FILE NAME...                    HAKUSAN & CO.

ORDER SHEET

TEMPLATE

PROCESSING STANDBY

APPROVED

| 1 | 2 | 3 | 4 |

CREATE    1102

NOVEMBER 1, 2015

ORDER NUMBER 123456 9

TO: NISHITORIDE HAKUSAN & CO.
WE WOULD LIKE TO ORDER
YOUR PRODUCTS AS FOLLOWS.
DELIVERY DATE: OCTOBER 25, 2015

| No | PRODUCT/MERCHANDISE/MATERIAL | QUANTITY | UNIT PRICE | AMOUNT |
|----|------------------------------|----------|------------|--------|
| 1  | PRODUCT/MERCHANDISE/MATERIAL NAME 1  | 10  | 500    | 5,000   |
| 2  | PRODUCT/MERCHANDISE/MATERIAL NAME 2  | 100 | 11,000 | ####### |
| 3  | PRODUCT/MERCHANDISE/MATERIAL NAME 1  | 200 | 500    | 100,000 |
| 4  | PRODUCT/MERCHANDISE/MATERIAL NAME 3  | 10  | 10,000 | 100,000 |
| 5  | PRODUCT/MERCHANDISE/MATERIAL NAME 4  | 20  | 13,000 | 260,000 |
| 6  | PRODUCT/MERCHANDISE/MATERIAL NAME 5  | 50  | 14,000 | 700,000 |
| 7  | PRODUCT/MERCHANDISE/MATERIAL NAME 8  | 20  | 17,000 | 340,000 |
| 8  | PRODUCT/MERCHANDISE/MATERIAL NAME 9  | 30  | 18,000 | 540,000 |
| 9  | PRODUCT/MERCHANDISE/MATERIAL NAME 11 | 40  | 20,000 | 800,000 |
| 10 | PRODUCT/MERCHANDISE/MATERIAL NAME 12 | 10  | 21,000 | 210,000 |
| 11 | PRODUCT/MERCHANDISE/MATERIAL NAME 15 | 30  | 24,000 | 720,000 |
| 12 |                                      |     |        |         |
| 13 |                                      |     |        |         |
| 14 |                                      |     |        |         |

DECISION

| FILE NAME... | | CREATE | CREATE NEW CANDIDATE |
|---|---|---|---|

ORDER SHEET

HAKUSAN & CO.

ORDER SHEET

TEMPLATE

PROCESSING STANDBY

| 1 | 2 | 3 | 4 |
|---|---|---|---|

NOVEMBER 1, 2015

TO: NISHITORIDE HAKUSAN & CO.

WE WOULD LIKE TO ORDER YOUR PRODUCTS AS FOLLOWS.

DELIVERY DATE: OCTOBER 25, 2015

ORDER NUMBER 123456 9

| No | | QUANTITY | UNIT PRICE | AMOUNT |
|---|---|---|---|---|
| 1 | PRODUCT/MERCHANDISE/MATERIAL NAME 1 | 10 | 500 | 5,000 |
| 2 | PRODUCT/MERCHANDISE/MATERIAL NAME 2 | 100 | 11,000 | ####### |
| 3 | PRODUCT/MERCHANDISE/MATERIAL NAME 1 | 200 | 500 | 100,000 |
| 4 | PRODUCT/MERCHANDISE/MATERIAL NAME 3 | 10 | 10,000 | 100,000 |
| 5 | PRODUCT/MERCHANDISE/MATERIAL NAME 4 | 20 | 13,000 | 260,000 |
| 6 | PRODUCT/MERCHANDISE/MATERIAL NAME 5 | 50 | 14,000 | 700,000 |
| 7 | PRODUCT/MERCHANDISE/MATERIAL NAME 8 | 20 | 17,000 | 340,000 |
| 8 | PRODUCT/MERCHANDISE/MATERIAL NAME 9 | 30 | 18,000 | 540,000 |
| 9 | PRODUCT/MERCHANDISE/MATERIAL NAME 11 | 40 | 20,000 | 800,000 |
| 10 | PRODUCT/MERCHANDISE/MATERIAL NAME 12 | 10 | 21,000 | 210,000 |
| 11 | PRODUCT/MERCHANDISE/MATERIAL NAME 15 | 30 | 24,000 | 720,000 |
| 12 | | | | |
| 13 | | | | |
| 14 | | | | |

DECISION

| ORDER SHEET_HAKUSAN & CO. | | | | CREATE | CREATE NEW CANDIDATE |

1103 → HAKUSAN & CO.
1104 → ORDER SHEET
TEMPLATE
PROCESSING STANDBY

[1] [2] [3] [4]

ORDER SHEET

NOVEMBER 1, 2015

TO: NISHITORIDE HAKUSAN & CO.

WE WOULD LIKE TO ORDER YOUR PRODUCTS AS FOLLOWS.

DELIVERY DATE: OCTOBER 25, 2015

ORDER NUMBER 123456 9

| No | | QUANTITY | UNIT PRICE | AMOUNT |
|---|---|---|---|---|
| 1 | PRODUCT/MERCHANDISE/MATERIAL NAME 1 | 10 | 500 | 5,000 |
| 2 | PRODUCT/MERCHANDISE/MATERIAL NAME 2 | 100 | 11,000 | ####### |
| 3 | PRODUCT/MERCHANDISE/MATERIAL NAME 1 | 200 | 500 | 100,000 |
| 4 | PRODUCT/MERCHANDISE/MATERIAL NAME 3 | 10 | 10,000 | 100,000 |
| 5 | PRODUCT/MERCHANDISE/MATERIAL NAME 4 | 20 | 13,000 | 260,000 |
| 6 | PRODUCT/MERCHANDISE/MATERIAL NAME 5 | 50 | 14,000 | 700,000 |
| 7 | PRODUCT/MERCHANDISE/MATERIAL NAME 8 | 20 | 17,000 | 340,000 |
| 8 | PRODUCT/MERCHANDISE/MATERIAL NAME 9 | 30 | 18,000 | 540,000 |
| 9 | PRODUCT/MERCHANDISE/MATERIAL NAME 11 | 40 | 20,000 | 800,000 |
| 10 | PRODUCT/MERCHANDISE/MATERIAL NAME 12 | 10 | 21,000 | 210,000 |
| 11 | PRODUCT/MERCHANDISE/MATERIAL NAME 15 | 30 | 24,000 | 720,000 |
| 12 | | | | |
| 13 | | | | |
| 14 | | | | |

508 — DECISION

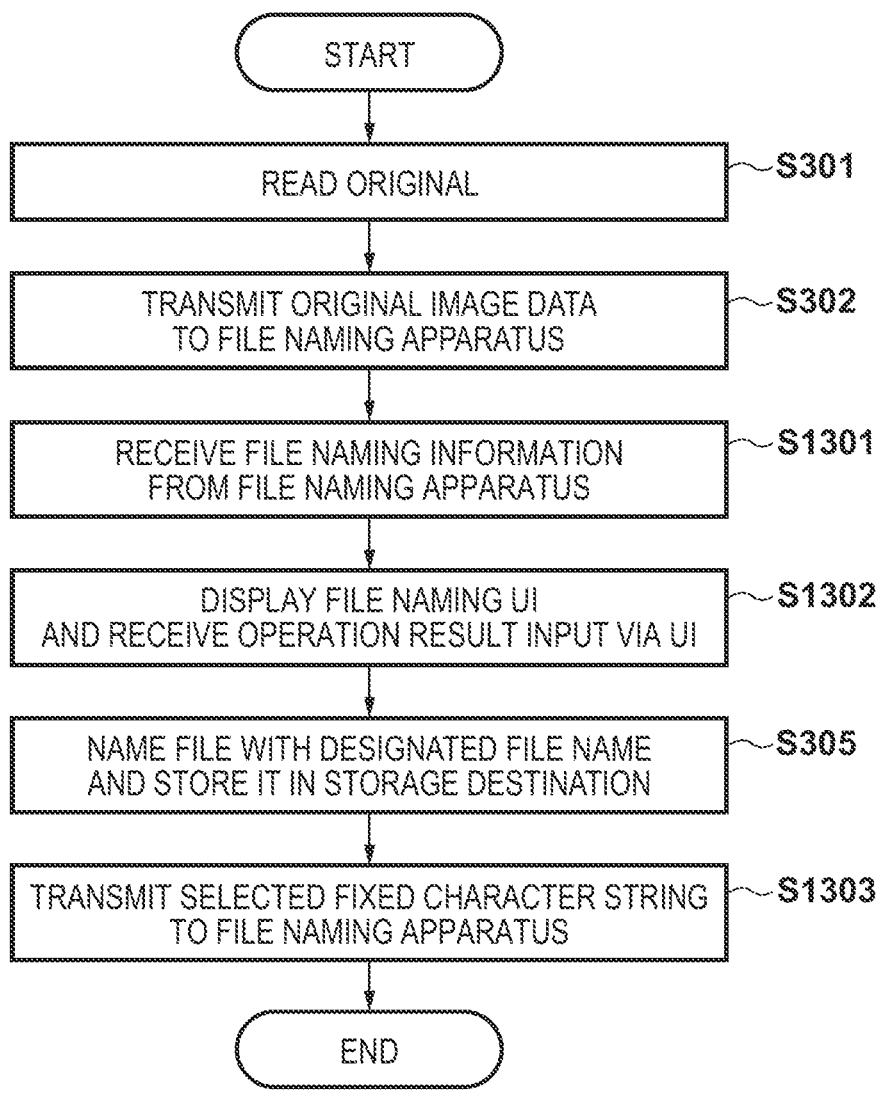

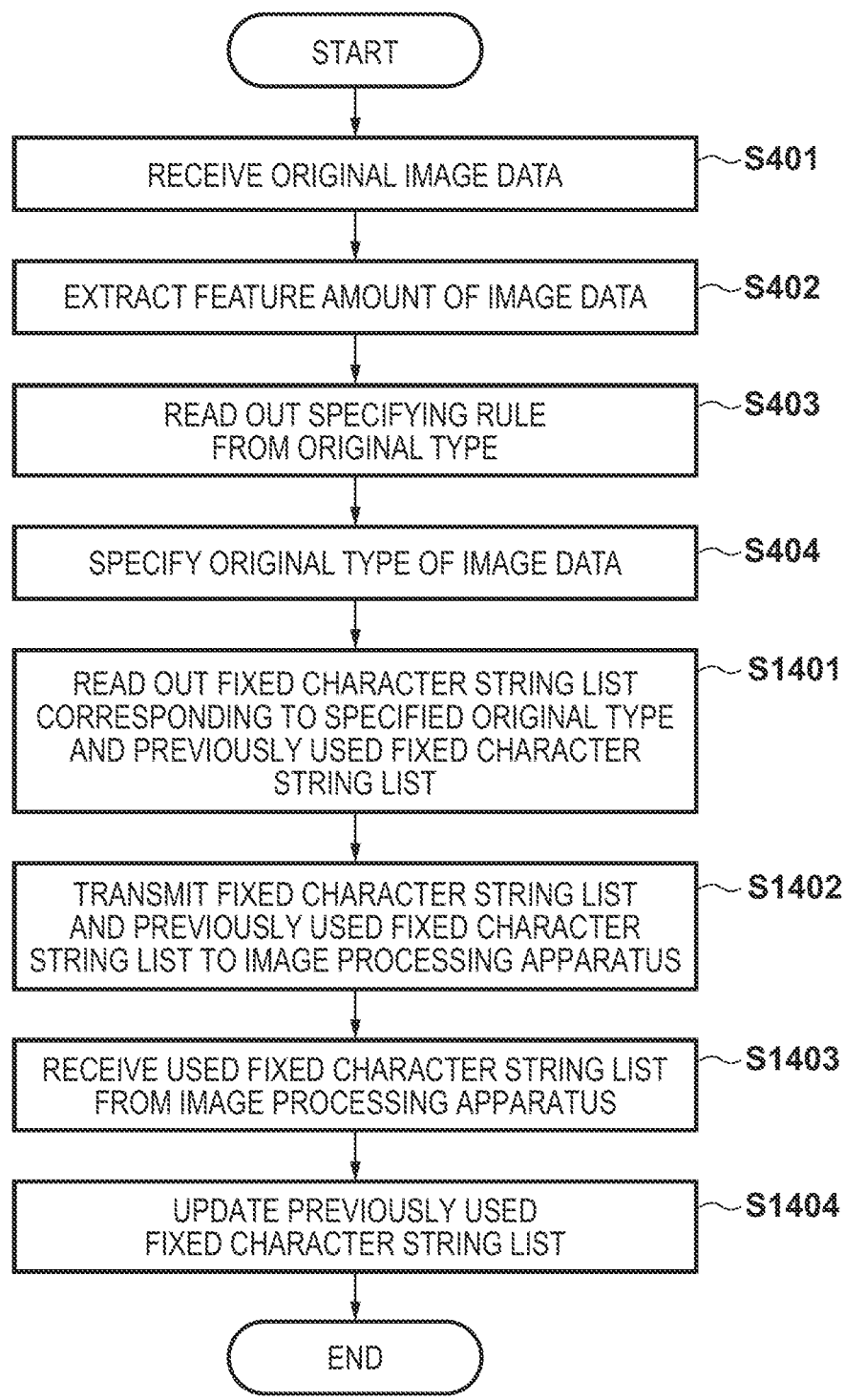

FIG. 15

507 — ORDER SHEET_PROCESSING STANDBY

1501 ORDER SHEET
1502 PROCESSING STANDBY
1503 TEMPLATE
1504 APPROVED

1 | 2 | 3 | 4

508 DECISION

ORDER SHEET

NOVEMBER 1, 2015

TO: NISHITORIDE HAKUSAN & CO.

ORDER NUMBER 123456 9

WE WOULD LIKE TO ORDER
YOUR PRODUCTS AS FOLLOWS.

DELIVERY DATE: OCTOBER 25, 2015

| No | | QUANTITY | UNIT PRICE | AMOUNT |
|---|---|---|---|---|
| 1 | PRODUCT/MERCHANDISE/MATERIAL NAME 1 | 10 | 500 | 5,000 |
| 2 | PRODUCT/MERCHANDISE/MATERIAL NAME 2 | 100 | 11,000 | ####### |
| 3 | PRODUCT/MERCHANDISE/MATERIAL NAME 1 | 200 | 500 | 100,000 |
| 4 | PRODUCT/MERCHANDISE/MATERIAL NAME 3 | 10 | 10,000 | 100,000 |
| 5 | PRODUCT/MERCHANDISE/MATERIAL NAME 4 | 20 | 13,000 | 260,000 |
| 6 | PRODUCT/MERCHANDISE/MATERIAL NAME 5 | 50 | 14,000 | 700,000 |
| 7 | PRODUCT/MERCHANDISE/MATERIAL NAME 8 | 20 | 17,000 | 340,000 |
| 8 | PRODUCT/MERCHANDISE/MATERIAL NAME 9 | 30 | 18,000 | 540,000 |
| 9 | PRODUCT/MERCHANDISE/MATERIAL NAME 11 | 40 | 20,000 | 800,000 |
| 10 | PRODUCT/MERCHANDISE/MATERIAL NAME 12 | 10 | 21,000 | 210,000 |
| 11 | PRODUCT/MERCHANDISE/MATERIAL NAME 15 | 30 | 24,000 | 720,000 |
| 12 | | | | |
| 13 | | | | |
| 14 | | | | |

| ORIGINAL TYPE | ORIGINAL TYPE SPECIFYING RULE | FIXED CHARACTER STRING |
|---|---|---|
| ORIGINAL TYPE A | CHARACTER STRING AAA IS INCLUDED IN ORIGINAL | AAA<br>CCC<br>EEE |
| ORIGINAL TYPE B | CHARACTER STRING BBB IS INCLUDED IN ORIGINAL | BBB<br>DDD<br>FFF |

IMAGE PROCESSING APPARATUS, METHOD OF CONTROLLING THE SAME, AND STORAGE MEDIUM

BACKGROUND OF THE INVENTION

Field of the Invention

The present invention relates to an image processing apparatus, a method of controlling the same, and a storage medium.

Description of the Related Art

There exists a work flow for reading a paper document such as a form with a scanner and digitizing the paper document. At this time, a naming operation of adding a file name to the image data of the digitized original in accordance with the type and contents of the original is performed. Assume that a user performs this naming operation using a keyboard. If the number of types of paper originals to be digitized is large, a large load is imposed on the user. In particular, if the user must input file names using a software keyboard due to the limitation of a user interface, this load increases.

To solve this problem, Japanese Patent Laid-Open No. 2009-205325 discloses the following technique. A plurality of types of originals are determined in advance, and a specifying rule is determined to specify the type of each original out of the plurality of types of originals. In addition, a naming rule for uniquely determining a file name is registered for the type of each original. In this naming rule, a character string used for a file name includes the name of the type of original, the name of operator, the date at the time of specifying operation, the scan execution number, and the like. When the original is scanned, the feature of the image data of this original is extracted, and the feature is collated with the type specifying rule, thereby specifying the type of image data of the original. By using the naming rule of the file name of the specified type, the file name is automatically decided. As described above, only when the user sets the specifying rule for each type of original and the naming rule of the file name, the subsequent naming processing load for the file name can be reduced.

In the related art described above, however, the naming rule must be registered in linkage with an original before the original is scanned. The naming rule is always fixed at the time of scanning unless the rule is changed. For example, if there exits the type of original as "order sheet" and the naming rule is "order sheet_scan", the file name of the image data of the original of "order sheet" is always set to "order sheet_scan". Assume that a fixed character string "before processing" is applied to the original corresponding to the "order sheet" to obtain a file name "order sheet_before processing". In this case, the user must determine "order sheet_before processing", the type of original having a new naming rule, and a type specifying rule corresponding to this type. In addition, in order to specify the type using this specifying rule, a feature must be imparted to the original.

In general, even if identical features are read from originals, the user wants to distinguish the scanned image data from each other by using different file names. In a concrete example, in a general original work flow, fixed character strings such as "before processing" and "template" are added to file names to distinguish the files from each other. In order to distinguish the file names of image data of originals having identical features in the related art, the naming rule must be changed before the user scans the original, and the naming rule must be restored after the user scans the original. This job has a heavier work load on the user than a case in which the user inputs a file name from a keyboard. Alternatively, it is possible for the user to give a file name desired by the user by allowing the user to input a file name from a keyboard after original scanning. This job also has a heavy load on the user.

Assume that the user adds only a file name "order sheet_before processing". A selection button for naming a file using a fixed character string "order sheet" and a fixed character string "before processing" are displayed on an UI in advance, and the user selects a file name using this selection button. In this case, if fixed character strings assumed to be used for a file name are exhaustively displayed on the UI to allow the user to select desired fixed character strings, the number of fixed character strings is enormous. A job for searching for the fixed character strings "order sheet" and "before processing" from these enormous fixed character strings imposes a heavy load on the user. As described above, even if a single original is scanned, it is very difficult to easily give a file name intended by the user and easily search for fixed character strings to be used for a file name by the user on the UI.

SUMMARY OF THE INVENTION

An aspect of the present invention is to eliminate the above-mentioned problem with conventional technology.

A feature of the present invention is to provide a technique for specifying the type of original from image data of the original and decide the file name of the image data from candidate character strings for a file name corresponding to the type of original.

According to a first aspect of the present invention, there is provided an image processing apparatus comprising: a memory that stores a set of instructions; and at least one processor that executes the instructions to function the image processing apparatus as: an obtaining unit that obtains image data obtained by reading an original; a specifying unit that specifies a type of the original using the image data obtained by the obtaining unit; a display control unit that displays, on a display unit, character strings used for a name of a file of the obtained image data as selectable candidates of character strings; and a setting unit that sets a character string selected by a user from the character strings displayed on the display unit, as a character string used for the name of the file of the image data, wherein the character strings displayed on the display unit by the display control unit are decided in accordance with the type of the original specified by the specifying unit.

According to a second aspect of the present invention, there is provided a method of controlling an image processing apparatus, comprising: obtaining image data generated by reading an original; specifying a type of the original by using a feature amount of the image data obtained in the obtaining; displaying, on a display unit, a character string to be selected in accordance with the type of the original specified in the specifying, as a character string capable of being used for a name of a file of the image data; and setting a character string selected by a user from the character string displayed on the display unit, as a character string used for the name of the file.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a flowchart for describing preparation processing by a file naming apparatus according to the first embodiment;

FIG. 3 is a flowchart for describing processing by an image processing apparatus according to the first embodiment;

FIGS. 5A and 5B depict views showing screen examples displayed on a display unit of the image processing apparatus according to the first embodiment;

FIGS. 6A and 6B depict views showing screen examples displayed on the display unit of the image processing apparatus according to the first embodiment;

FIG. 7 depicts a view showing an example of an original image read by the image processing apparatus according to the first embodiment;

FIG. 8 depicts a view showing an example of an original image read by the image processing apparatus according to the first embodiment;

FIG. 9 is a flowchart for describing file naming processing for the read original image data by an image processing apparatus according to a second embodiment;

FIGS. 11A and 11B depict views showing screen examples displayed on a display unit of the image processing apparatus according to the second embodiment;

FIGS. 12A and 12B depict views showing screen examples displayed on the display unit of the image processing apparatus according to the second embodiment;

FIG. 13 is a flowchart for describing processing by an image processing apparatus according to the third embodiment;

FIG. 14 is a flowchart for describing processing for causing the file naming apparatus of the third embodiment to receive image data of an original from the image processing apparatus and transmit a fixed character string corresponding to the type of original to the image processing apparatus;

FIG. 15 depicts a view showing an example of a UI screen displayed on a display unit of the image processing apparatus according to a third embodiment;

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Figure 1:
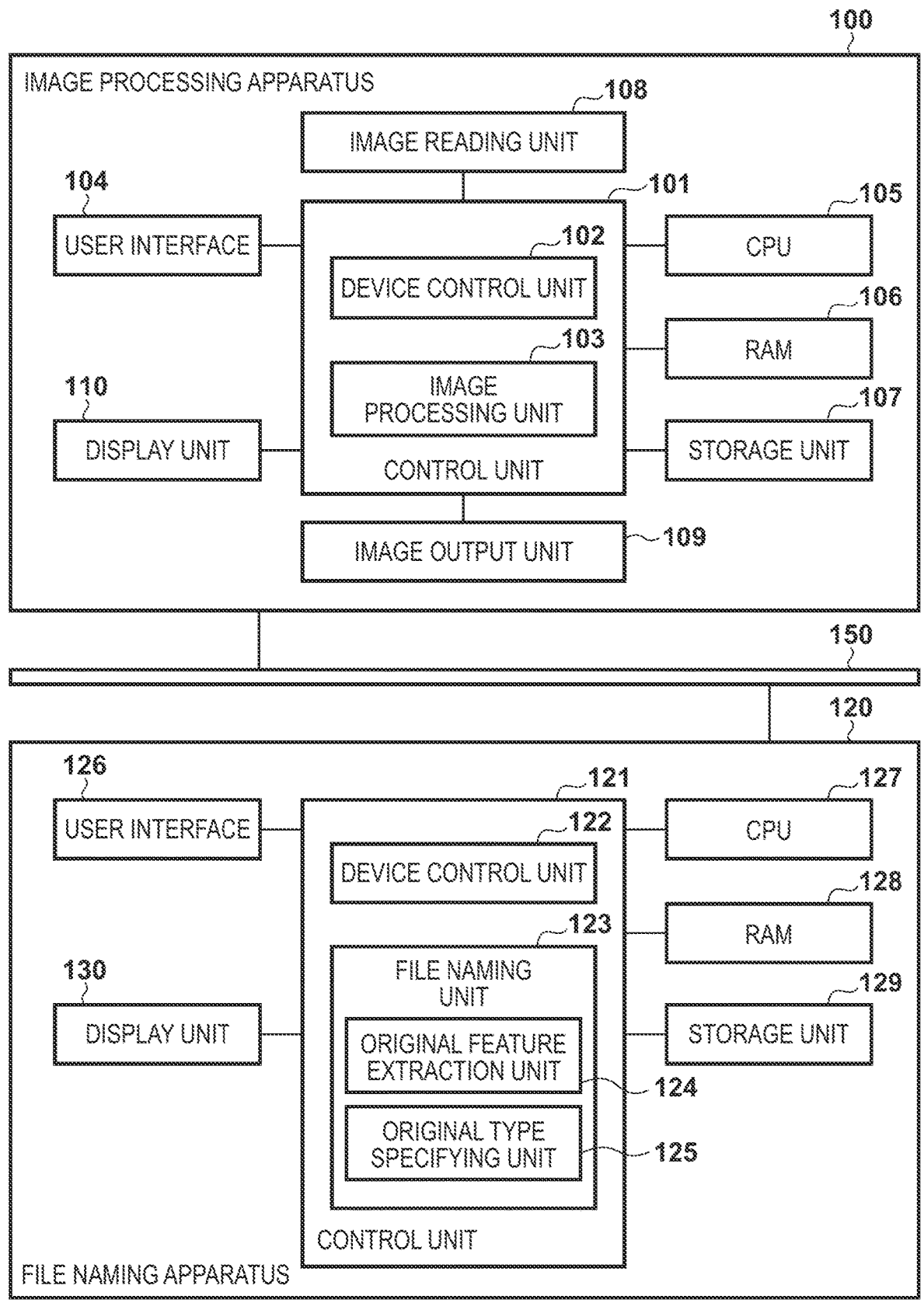
FIG. 1 is a block diagram showing an arrangement example of an information processing system according to a first embodiment.

FIG. 1 is a block diagram showing an arrangement example of an information processing system according to the first embodiment. The system according to the first embodiment will be described as a system for optically reading an original by a scanner or the like to obtain image data of its original and giving a file name to a file generated based on the image data. As shown in FIG. 1, this system includes an image processing apparatus 100 and a file naming apparatus 120. The image processing apparatus 100 and the file naming apparatus 120 are connected to each other to communicate data via a network 150.

The image processing apparatus 100 includes a user interface (UI) 104, a CPU 105, a RAM 106, a storage unit 107, an image reading unit 108, an image output unit 109, and a display unit 110. These components are communicably connected via a control unit 101. The control unit 101 includes a device control unit 102 for entirely controlling the image processing apparatus 100 and an image processing unit 103 for processing image data.

When the image processing apparatus 100 is powered on, the CPU 105 executes an initial program of the storage unit 107 and reads out the main program from the storage unit 107 to deploy it in the RAM 106. The RAM 106 is used to store programs and serves as a work main memory. The CPU 105 executes the program deployed in the RAM 106 to control the operation of the image processing apparatus 100. The functions of the device control unit 102 and the image processing unit 103 of the control unit 101 are achieved when the CPU 105 executes the above programs.

The image reading unit 108 is made from, for example, a scanner and reads a paper document (original) to obtain image data obtained by digitizing the image of the original. When the control unit 101 obtains the image data obtained by the image reading unit 108, the control unit 101 stores the image data in the storage unit 107. When executing naming processing (to be described later), the control unit 101 transmits, to the file naming apparatus 120 via the network 150, the image data stored in the storage unit 107. The control unit 101 receives file naming information from the file naming apparatus 120 via the network 150. The file naming information will be described in detail later.

The control unit 101 generates a UI screen for file naming using the original image data stored in the storage unit 107 and the file naming information received from the file naming apparatus 120 and displays the UI screen on the display unit 110. When the control unit 101 supplies, to the image output unit 109, the original image data stored in the storage unit 107, the image output unit 109 executes processing for outputting the image data in various kinds of formats. For example, the image output unit 109 may store the image data of the original in a storage medium or execute processing for printing the image based on the image data on a medium such as a paper medium.

The user interface 104 includes, for example, a keyboard, a mouse®, and any other input/output unit and can input and set various kinds of setting values or designated values. The user interface 104 in the first embodiment is used to name a file. The control unit 101 transmits a named file to the file naming apparatus 120 via the network 150.

The above-described image processing apparatus 100 is merely an example. The image processing apparatus 100 may have an arrangement without the image output unit 109 out of the image reading unit 108 and the image output unit 109. The control unit 101 may transmit information for selecting the file naming information without transmission of the original image data to the file naming apparatus 120.

The file naming apparatus 120 includes a user interface (UI) 126, a CPU 127, a RAM 128, a storage unit 129, and a display unit 130. These components are communicably connected via a control unit 121. The control unit 121 includes a device control unit 122 for entirely controlling the file naming apparatus 120 and a file naming unit 123 for generating file naming information. The file naming unit 123 according to the first embodiment includes an original feature extraction unit 124 for extracting the feature of the image data of the original and an original type specifying unit 125 for specifying the type of original from the image data.

The user interface 126 includes, for example, a keyboard, a mouse, and any other input/output unit and can input and set various kinds of setting values or designated values. When the file naming apparatus 120 is powered on, the CPU 127 executes an initial program of the storage unit 129 and reads out the main program from the storage unit 129 to deploy it in the RAM 128. The RAM 128 is used to store programs and serves as a work main memory. The CPU 127 executes the program deployed in the RAM 128 to control the operation of the file naming apparatus 120. The function of the control unit 121 is achieved when the CPU 127 executes the above programs. The control unit 121 also executes processing for displaying, on the display unit 130, the original image data stored in the storage unit 129. The control unit 121 further provides, to the file naming unit 123, the image data transmitted from the image processing apparatus 100 and stored in the storage unit 129 of the file naming apparatus 120. Accordingly, the file naming unit 123 analyzes the image data and generates file naming information. The control unit 121 transmits the generated information to the image processing apparatus 100 via the network 150. The original feature extraction unit 124 of the file naming unit 123 performs processing for extracting a feature from the image data, thereby extracting the feature amount of the image data. The feature extraction processing will be described in detail later.

The original type specifying unit 125 of the file naming unit 123 specifies the type of original using the feature of the original image data extracted by the original feature extraction unit 124.

The above-described arrangement of the file naming apparatus 120 is merely an example, and the first embodiment is not limited to this. In place of receiving the original image data from the image processing apparatus 100, the control unit 121 may receive information for generating the file naming information and transmit it to the file naming unit 123. In this case, the file naming unit 123 does not perform analysis processing of the image data, but generates file naming information using the received information. The file naming unit 123 may have another arrangement as needed. For example, although the file naming apparatus 120 can be implemented by a computer apparatus such as a server, the functions of the storage unit 129 and the file naming unit 123 may be implemented by remote calculation resources called a cloud connected via the network 150. In addition, the image processing apparatus 100 may have a form including the functions of the file naming apparatus 120.

The operation of the system according to the first embodiment will now be described below.

FIG. 2 is a flowchart for describing preparation processing of the file naming apparatus 120 according the first embodiment. This processing is executed before the image processing apparatus 100 reads an original. Note that the processing represented by this flowchart is implemented when the CPU 127 executes a program deployed from the storage unit 129 to the RAM 128. The processing shown in FIG. 2 is started when the file naming apparatus 120 is initialized or when the user inputs an instruction for changing the initial setting via the user interface 104.

First of all, in step S201, the CPU 127 functions as the device control unit 122 and obtains initial setting registration information. In this obtaining method, the CPU 127 generates an initial setting user interface and displays it on the display unit 130, and a user operation result received through the display can be received from the user interface 126. Alternatively, the registration information may be stored as program codes in the storage unit 129, and the CPU 127 may read out the program codes. The initial setting registration information is information for performing initial setting of the original type database of the original type specifying unit 125.

Figures 16A, 16B:
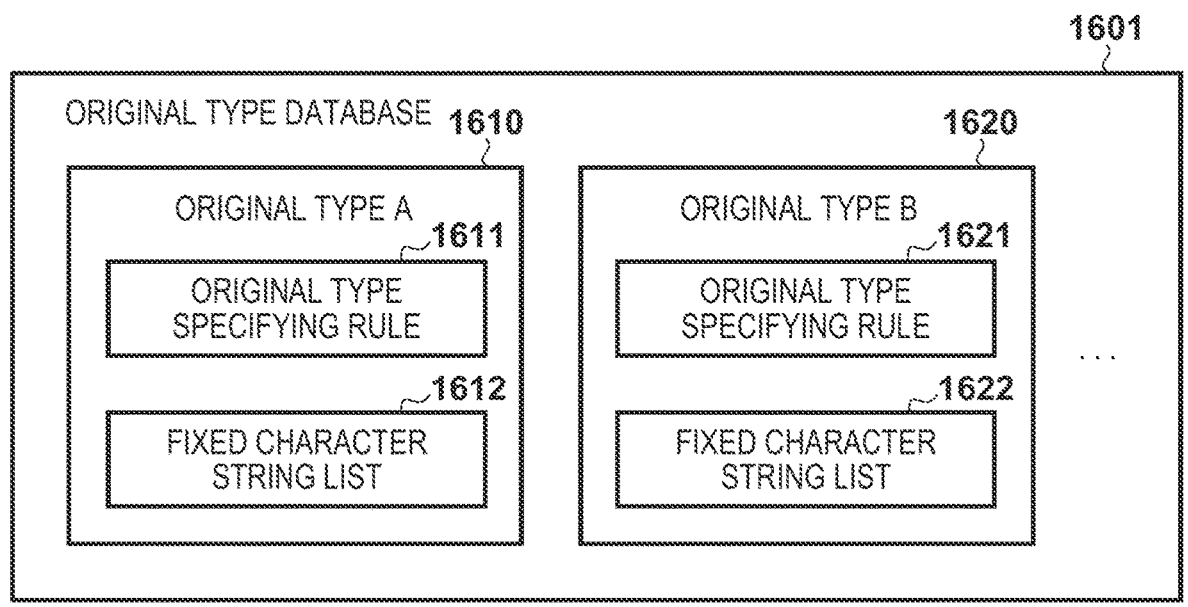
FIG. 16A is a block diagram for explaining an original type database according to the first embodiment.
FIG. 16B depicts a view showing a detailed example of an original type sorting rule and a fixed character string list as initial setting registration information.

FIG. 16A depicts a view for explaining an original type database 1601 according to the first embodiment.

The original type database 1601 has a plurality of types of originals. In FIG. 16A, the database 1601 has an original type A 1610 and an original type B 1620. Each original type includes an original type specifying rule and a fixed character string list (list of candidate character strings to be used for file names). In the example of FIG. 16A, the original type A 1610 includes an original type specifying rule 1611 and a fixed character string list 1612. The original type B 1620 includes an original type specifying rule 1621 and a fixed character string list 1622. Note that the number of types of originals of the original type database 1601 according to the first embodiment is not limited to two, but can be two or more.

FIG. 16B depicts a view showing the detailed examples of the original type specifying rules and the fixed character string lists which serve as the initial setting registration information.

FIG. 16B illustrates the original type specifying rules for specifying an original type as an original type A when an original includes a character string "AAA" and an original type as an original type B when an original includes a character string "BBB".

This initial setting registration information is registered in the original type database 1601 and includes an original type, an original type specifying rule, and a fixed character string list. Upon receiving this initial setting registration information, the CPU 127 transmits it to the file naming unit 123. The process then advances to step S202.

In step S202, the CPU 127 functions as the file naming unit 123. The CPU 127 receives the initial setting registration information, extracts original type information from the registration information, and registers the original type in the original type database 1601. The process then advances to step S203, and the CPU 127 functions as the file naming unit 123. The CPU 127 extracts an original type specifying rule corresponding to the original type from the initial setting registration information and registers the extracted original type specifying rule in the original type database 1601. The process then advances to step S204. In step S204, the CPU 127 functions as the file naming unit 123. The CPU 127 extracts fixed character string list information corresponding to the original type from the initial setting registration information obtained in step S202 and registers the extracted information in the original type database 1601.

The flowchart for explaining preparation processing of the file naming apparatus 120 which is performed before the original is scanned has been described above.

FIG. 3 is a flowchart for describing processing by the image processing apparatus 100 according to the first embodiment. This processing is started when the user interface 104 receives an original reading instruction from the user. Note that the processing shown in this flowchart is implemented when the CPU 105 executes a program deployed from the storage unit 107 to the RAM 106.

In step S301, the CPU 105 serves as the device control unit 102. The CPU 105 causes the image reading unit 108 to read an original to create image data. The CPU 105 then functions as the image processing unit 103. The CPU 105 performs image processing such as color conversion processing and tone correction on the image data and stores the processed image data in the RAM 106. The processed image data stored in the RAM 106 is stored in the storage unit 107. The process then advances to step S302, and the CPU 105 functions as the device control unit 102. The CPU 105 transmits the image data stored in the storage unit 107 to the file naming apparatus 120 via the network 150.

The process then advances to step S303, and the CPU 105 functions as the device control unit 102. The CPU 105 receives information necessary for generating the file naming user interface (UI) from the file naming apparatus 120. The file naming UI will be described in step S304. The information to be received is a fixed character string list linked with the original type, as shown in FIG. 16B. The fixed character string list includes a plurality of fixed character strings to be used to name files.

The process then advances to step S304, and the CPU 105 functions as the device control unit 102. The CPU 105 generates a UI screen for naming a file by using the information obtained in step S303. The generated screen is displayed on the display unit 110. The CPU 105 accepts a file naming instruction from the user via the user interface 104. The CPU 105 appropriately updates the file naming UI based on an instruction from the user interface 104. Upon reception of a message indicating that the file name is confirmed from the user interface 104, the CPU 105 advances the process to step S305.

An example of the file naming user interface will be described with reference to FIGS. 5A to 8.

FIGS. 5A, 5B, 6A, and 6B are views showing screen examples displayed on the display unit 110 of the image processing apparatus 100 according to the first embodiment.

FIGS. 7 and 8 depict views showing the examples of original images read by the image processing apparatus 100 according to the first embodiment. The examples of the UI in reading the original in FIG. 7 are user interface screens shown in FIGS. 5A, 5B, and 6A. The example of the UI in reading the original in FIG. 8 is shown in FIG. 6B.

Figure 5A:
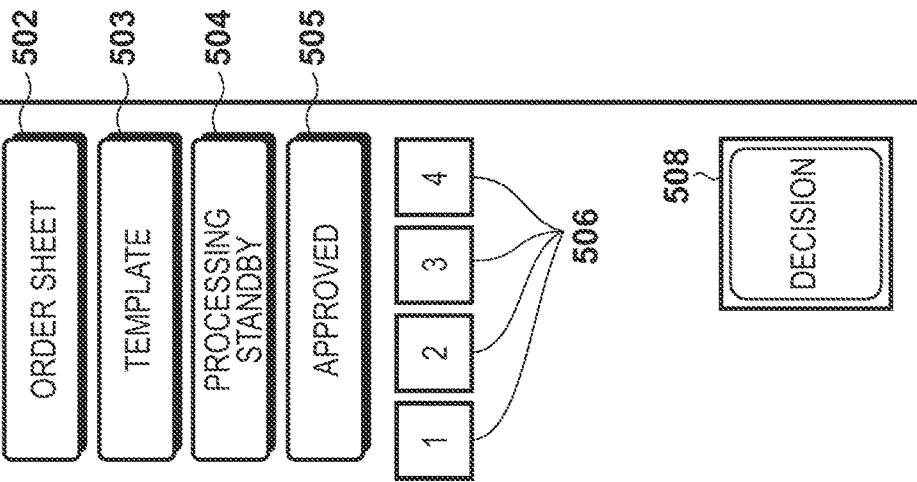

FIG. 5A shows an example of the UI screen displayed on the display unit 110 of the image processing apparatus 100 according to the first embodiment.

This UI screen includes a region 501 in which an image of a read original is displayed, and selection buttons 502 to 505 for selecting a fixed character string in a fixed character string list to name a file. The UI screen also includes switching buttons 506 for switching the fixed character strings displayed in the selection buttons 502 to 505 to other fixed character strings included in the fixed character string list. For example, the state of FIG. 5A shows a state in which "1" of the switching buttons 506 is selected. When "2" is selected, other fixed character strings are displayed in the selection buttons 502 to 505. The UI screen also includes a file name display area 507 in which a named file name is displayed and a file name decision button 508 for deciding the file name. In this case, a order sheet shown in FIG. 7 is read, and part of the order sheet in FIG. 7 is displayed in the region 501.

FIG. 5B shows a screen example showing a state in which the selection button 502 written with the "order sheet" by the user is selected. When the selection button 502 is selected, the UI is updated to change the display of the selection button 502 such that the selection button 502 is selected. In the example of FIG. 5B, the color of the selection button 502 is changed, and the shadow around the selection button 502 is eliminated to indicate a state in which the selection button 502 is selected. In addition, the fixed character string "order sheet" included in the selection button 502 is displayed in the file name display area 507.

FIG. 6A depicts a view showing a state in which the selection button 504 written with "processing standby" added by the user is selected. When the selection button 504 is selected, the UI is updated, and the display of the selection button 504 is changed so that the selection button 504 is selected. The fixed character string "processing standby" included in the selection button 504 is connected, with "_", to the character string "order sheet" already displayed in the file name display area 507 and is displayed in the file name display area 507. As a result, a character string "order sheet_processing standby" is displayed in the file name display area 507.

In a case that a large number of fixed character strings are present in the fixed character string list displayed on the UI, all the fixed character strings may not be simultaneously displayed on the UI. In this case, processing for setting pages in the fixed character string list and switching between the pages must be provided in correspondence with an operation on the UI. For example, the fixed character string switching buttons 506 may be associated with the pages in the fixed character string list and switched using the switching buttons 506. For this reason, if any one of the switching buttons 506 is selectively pressed, the fixed character string corresponding to the pressed switching button 506 may be displayed in each of the selection buttons 502 to 505.

FIG. 6B shows an example when reading an original (invoice) in FIG. 8 unlike the case of FIGS. 5A, 5B, and 6A. Since the type of original in FIG. 6B is different from the case of FIGS. 5A, 5B, and 6A, the fixed character strings included in the selection buttons 502 to 505 are changed to the type of original (invoice) in FIG. 8. In this manner, when the type of scanned original is changed, the fixed character strings to be presented to the user are also changed.

When the user presses the file name decision button 508, the file name of this original image becomes the character string included in the file name display area 507. In this manner, even if the user does not manually input the file name, the fixed character string registered in advance can be used to name the file.

The process then advances to step S305, and the CPU 105 functions as the device control unit 102. The CPU 105 sets the file name decided in step S304 as the file name of the image data. The CPU 105 generates a file based on the image data. In an appropriate storage destination based on an instruction from the user via the user interface 104 and the network 150, the CPU 105 stores the file generated from the image data with the above file name. The CPU 105 ends this processing.

The processing by the image processing apparatus 100 according to the first embodiment has been described above. However, the processing of the image processing apparatus 100 according to the first embodiment is not limited to the flowchart in FIG. 3. For example, in step S302, an UI for selecting the type of original may be created and displayed on the display unit 110 in place of transmission of the original image data from the image processing apparatus 100 to the file naming apparatus 120. The information for selecting the original type of the user may be received and transmitted to the file naming apparatus 120 via the user interface 104.

Figure 4A:
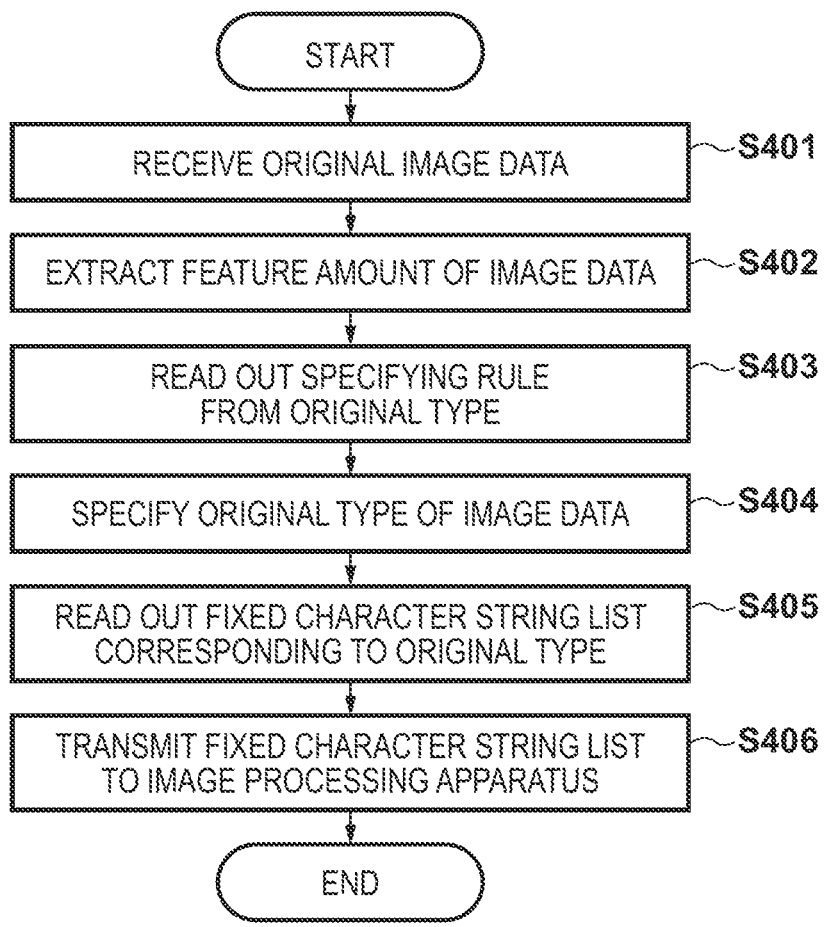
FIGS. 4A and 4B are flowcharts for describing processing for causing the file naming apparatus of the first embodiment to receive image data of an original from the image processing apparatus and transmit a fixed character string corresponding to the type of original to the image processing apparatus.

FIG. 4A is a flowchart for describing processing in which the file naming apparatus 120 of the first embodiment receives the original image data from the image processing apparatus 100, and the fixed character string corresponding to this original type is transmitted to the image processing apparatus 100. Note that the processing of this flowchart is implemented when the CPU 127 executes the program deployed from the storage unit 129 to the RAM 128. The processing shown in FIG. 4A is started when the image data obtained by reading the original by the image processing apparatus 100 is received from the image processing apparatus 100.

In step S401, the CPU 127 functions as the device control unit 122. The CPU 127 receives the image data from the image processing apparatus 100 via the network 150. The received image data is stored in the storage unit 129. The process then advances to step S402, and the CPU 127 functions as the original feature extraction unit 124 of the file naming unit 123. The CPU 127 reads out the image data from the storage unit 129 and develops it in the RAM 128. The feature amount of the developed image data is extracted. This feature amount may be a character string included in a certain original as the basis of the image data or the layout of the original image. Alternatively, the feature amount may be information obtained by reading a specific image or barcode included in the original. In addition, the feature amount may be a feature amount such as a frequency distribution obtained by decomposing the frequency of the original image data. In the first embodiment, the feature amount of the image data are not limited to the ones described above, but appropriate known feature amounts can be used.

The flow then advances to step S403, and the CPU 127 functions as the original type specifying unit 125. The CPU 127 reads out an original type specifying rule from the type of original registered in the original type database 1601. This original type specifying rule corresponds to the feature amount of the image data (original) obtained in step S402 and can be a selected one of the plurality of original type specifying rules. The process then advances to step S404, and the CPU 127 functions as the original type specifying unit 125. The CPU 127 compares the original feature amount obtained in step S402 with the plurality of original type specifying rules in the original type database 1601. One of the original type specifying rules which best matches the feature amount is selected, and the corresponding type of original is decided.

The process then advances to step S405, and the CPU 127 functions as the original type specifying unit 125. The CPU 127 reads out a fixed character string list corresponding to the original type decided in step S404. Assume that there exists an original type exemplarily registered as the "order sheet" and that four fixed character strings, that is, "order sheet", "template", "processing standby", and "approved" are registered as the fixed character string list in the "order sheet". Assume also that there exists an original type registered as the "invoice" and that four fixed character strings, that is, "invoice", "associate companies", "received", "unbilled" are registered in the "invoice". When the "order sheet" is designated as the original type, the four fixed character strings, that is, the "order sheet", "template", "processing standby", and "approved" are read out from the fixed character string list corresponding to the "order sheet".

As described above, out of the eight fixed character strings registered as described above, the number of fixed character strings assumed to be used for file naming of the original type "order sheet" is limited to four, and the limited fixed character strings can be presented to the user. If the user wants to use the two fixed character strings of "order sheet" and "processing standby" for file naming, the load imposed on the user to search for the fixed character strings can be reduced.

As described above, when fixed character strings to be selected are limited in accordance with an original type, the user does not need to search for desired fixed character strings from a large number of fixed character strings to be used for file naming. The load imposed on the user to name files can be reduced.

The above first embodiment has been described in which the number of types of originals registered in advance is two, and the number of fixed character strings registered in the fixed character string list is four. The present invention, however, is not limited to this. Note that a rule for replacing a fixed character string included in a fixed character string list with another fixed character string may be set in reading the fixed character string list. As an example, when a fixed character string "date" is included in a fixed character string list, the "date" may be replaced with another information like "October 20" on the day. As described above, when replacing the fixed character string with another character string, a character string which changes in file naming like the date can be easily used for file naming.

The process then advances to step S406, and the CPU 127 functions as the device control unit 122. The CPU 127 transmits, to the image processing apparatus 100 via the network 150, the fixed character string list read out by the original type specifying unit 125. The readout fixed character string list becomes a fixed character string list serving as information necessary for generating a file naming UI to be received by the image processing apparatus 100 in step S303 of FIG. 3.

Note that processing of the file naming apparatus 120 according to the first embodiment is not limited to the example of FIG. 4A. For example, in step S302 in FIG. 3, type information representing the original type may be received in place of the original image data from the image processing apparatus 100. In this case, as shown in FIG. 4B, the file naming apparatus 120 receives the original type information in step S410 to start its processing.

Figure 4B:
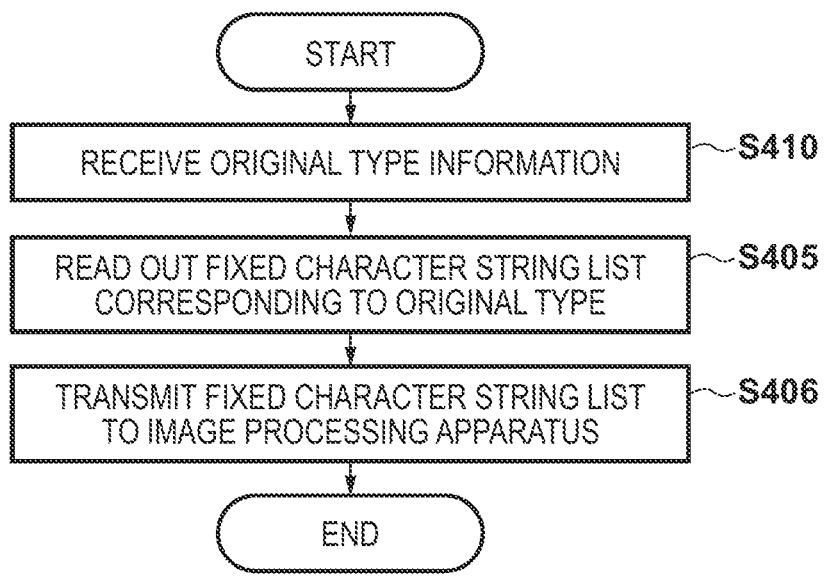

FIG. 4B is a flowchart for describing processing when the file naming apparatus 120 according to the first embodiment receives original type information from the image processing apparatus 100.

In FIG. 4B, original type specifying processing shown in steps S402 to S404 in FIG. 4A is omitted, and a fixed character string list is read out using the received original type information in step S405. In step S406, the CPU 127 transmits the fixed character string list read out from the original type specifying unit 125 to the image processing apparatus 100 via the network 150.

According to the first embodiment, as described above, fixed character strings for naming a file are displayed on a UI in association with the original type corresponding to the original image data, and the user selects character strings to be used for a file name from the displayed fixed character strings. Accordingly, when the user names a file, the user can easily search for character strings to be used for the file name, and the load imposed on the user for naming the name can be greatly reduced.

Second Embodiment

In the first embodiment described above, in a UI operation when scanning an original, the user often adds a new fixed character string and uses it for file naming. The added fixed character string may often be used in the subsequent operations as in the conventional fixed character strings. The second embodiment will cope with this. Note that the arrangements of an image processing apparatus 100, a file naming apparatus 120, and a system including these apparatuses according to the second embodiment are the same as in the first embodiment, and a description thereof will be omitted.

The second embodiment will be described for the part different from the first embodiment described above. The preparation processing flowchart executed before scan by the file naming apparatus 120 shown in FIG. 2 is the same as in the first embodiment.

FIG. 9 is a flowchart for describing file naming processing for the read original image data in the image processing apparatus 100 according to the second embodiment. The processing shown in FIG. 9 is started when the user inputs an original reading instruction via a user interface 104. Note that the processing of this flowchart is implemented when a CPU 105 executes a program deployed from a storage unit 107 to a RAM 106. Note also that the same steps as in the flowchart of FIG. 3 of the first embodiment denote the same operations in the flowchart of FIG. 9, and a description thereof will be omitted.

In the second embodiment, a difference occurs in the original type database 1601 of the first embodiment described with reference to FIG. 16A. This difference is that additional character string lists 1711 and 1721 are added to original types 1610 and 1620, respectively, of the original type database 1601 as shown in FIG. 17A.

Figure 17A:
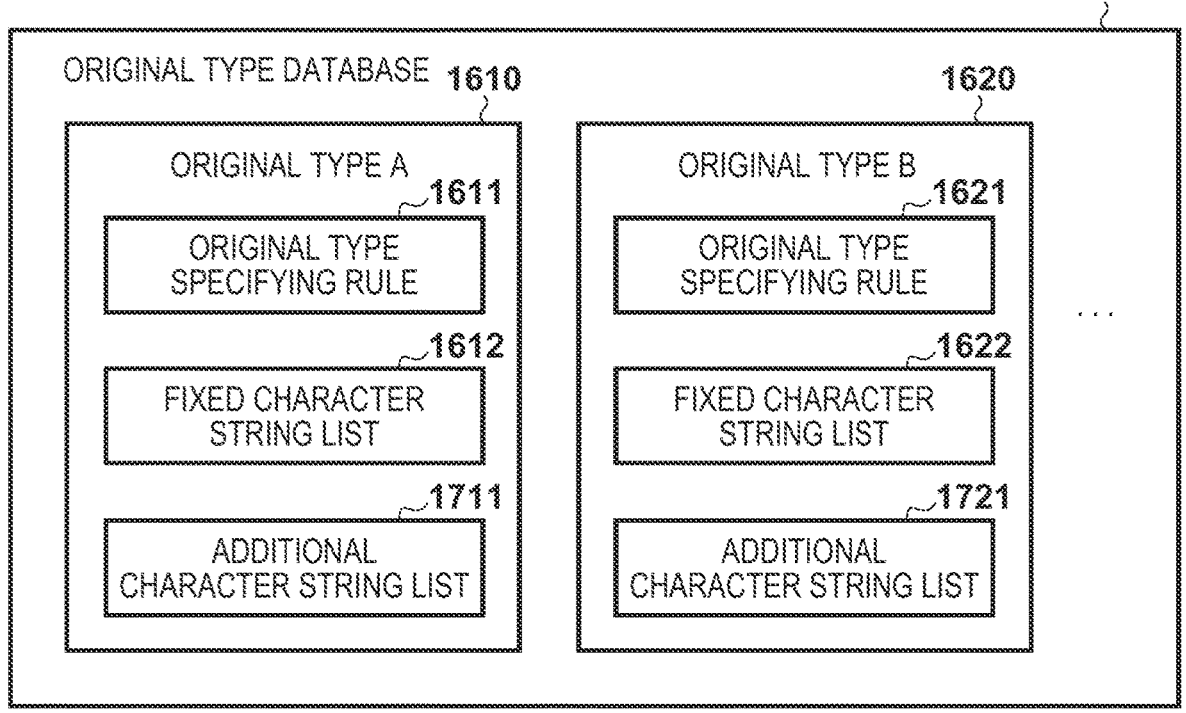
FIG. 17A is a block diagram for explaining an original type database according to the second embodiment.

FIG. 17A depicts a view for explaining the original type database 1601 according to the second embodiment.

The original type database 1601 according to the second embodiment will be described based on the arrangement of FIG. 17A. Note that as shown in an example, the number of additional character string lists is not limited to one for one original type. As an example, for each user who uses the file naming apparatus 120, an additional character string list is created in the original type, and an additional character string to be used may be switched upon user authentication. Alternatively, a plurality of additional character string lists may be prepared, original type specifying rules may be created in the respective additional character string lists, and an original type may be specified, using further another original feature amount, in an original type specified by an original feature amount in the original type specified by the original feature amount. Note that the respective additional character string lists need not be limited in the single file naming apparatus 120, but may be shared by connection to the plurality of file naming apparatuses 120.

When the process proceeds from step S303 in FIG. 9 to step S901, the CPU 105 functions as the device control unit 102. The CPU 105 generates and displays a UI screen for file naming using the information obtained in step S303 and receives a user operation via the UI. An example of this UI screen is shown in FIGS. 11A, 11B, 12A, and 12B.

FIGS. 11A, 11B, 12A, and 12B depict views showing the screen examples displayed on a display unit 110 of the image processing apparatus 100 according to the second embodiment.

FIGS. 11A, 11B, 12A, and 12B depict views illustrating screen examples in which a fixed character string input area 1101 and a fixed character string addition button 1102 are added to the screens of FIGS. 5A and 5B. Note that the same reference numerals as in FIGS. 5A to 6B denote the same parts in FIGS. 11A, 11B, 12A, and 12B, and a description thereof will be omitted. The screen thus created is displayed on the display unit 110 and can accept a file naming instruction via the user interface 104. The device control unit 102 appropriately updates the file naming UI based on an instruction from the user interface 104. The device control unit 102 receives a notification indicating that the file name is confirmed from the user interface 104, and the process then advances to step S902.

The difference of the file naming UI from that in FIGS. 5A and 5B will be described with reference to FIGS. 11A, 11B, 12A, and 12B.

In FIGS. 11A, 11B, 12A, and 12B, the UI is displayed on the display unit 110, and a user operation is performed using the user interface 104. In this case, a UI example upon reading an original (order sheet) shown in FIG. 7 is illustrated.

Figure 11A:
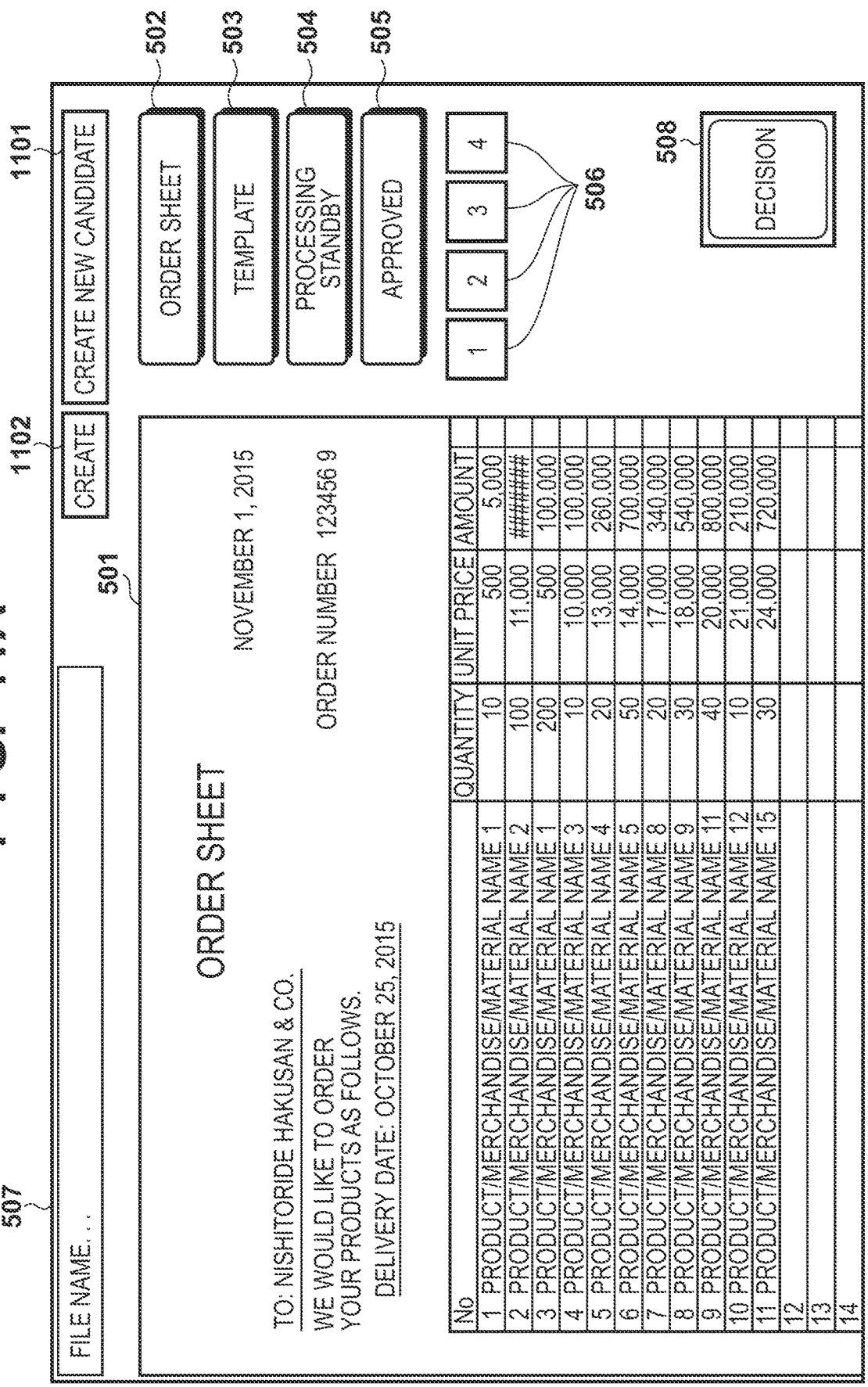

FIG. 11A illustrates the UI screen displayed first. The differences of FIG. 11A from FIG. 5A are that the screen is provided with the fixed character string input area 1101 for inputting a fixed character string to be added and a fixed character string addition button 1102 for adding the input fixed character string to a fixed character string list 502.

FIG. 11B shows a state in which the user inputs a fixed character string "Hakusan & Co." to the fixed character string input area 1101. In this state, when the fixed character string addition button 1102 is pressed, the screen shifts to the screen in FIG. 12A.

FIG. 12A shows a state in which a fixed character string button 1103 written as "Hakusan & Co." is added to the screen of FIG. 11A. As shown in FIG. 12A, when the fixed character string is added by the fixed character string addition button 1102, the newly added fixed character string is added to the head of the fixed character string list, and the fixed character string button before the addition is moved downward by one.

FIG. 12B shows a state in which a fixed character string button 1104 written as "order sheet" by the user and the fixed character string button 1103 written as "Hakusan & Co." are selected.

As shown in FIG. 12B, when the user presses a file name decision button 508 in a state in which the fixed character string is newly added, a character string "order sheet_Hakusan & Co." included in a file name display area 507 is used as the file name of this order image data. In addition, a notification indicating that the character string is added and the added character string information are transmitted from the UI 104 to the device control unit 102.

As described above, the user can name a file by using the newly added character string.

Referring back to FIG. 9, the process advances to step S902, and the CPU 105 functions as the device control unit 102. The file name decided by the user operation in step S901 is set as the file name of this image data. The image data is stored as its file name in the appropriate storage destination based on an instruction from the user via the user interface 104 and the network 150. The process then advances to step S903, and the CPU 105 determines whether or not the notification indicating the character string has been added is received from the user interface 104. If the added character string is present, the flow advances to step S904; otherwise, this processing ends. In step S904, the CPU 105 functions as the device control unit 102. The CPU 105 transmits the message indicating that the character string has been added and the added character string to the file naming apparatus 120 via the network 150. This processing then ends.

Figure 10:
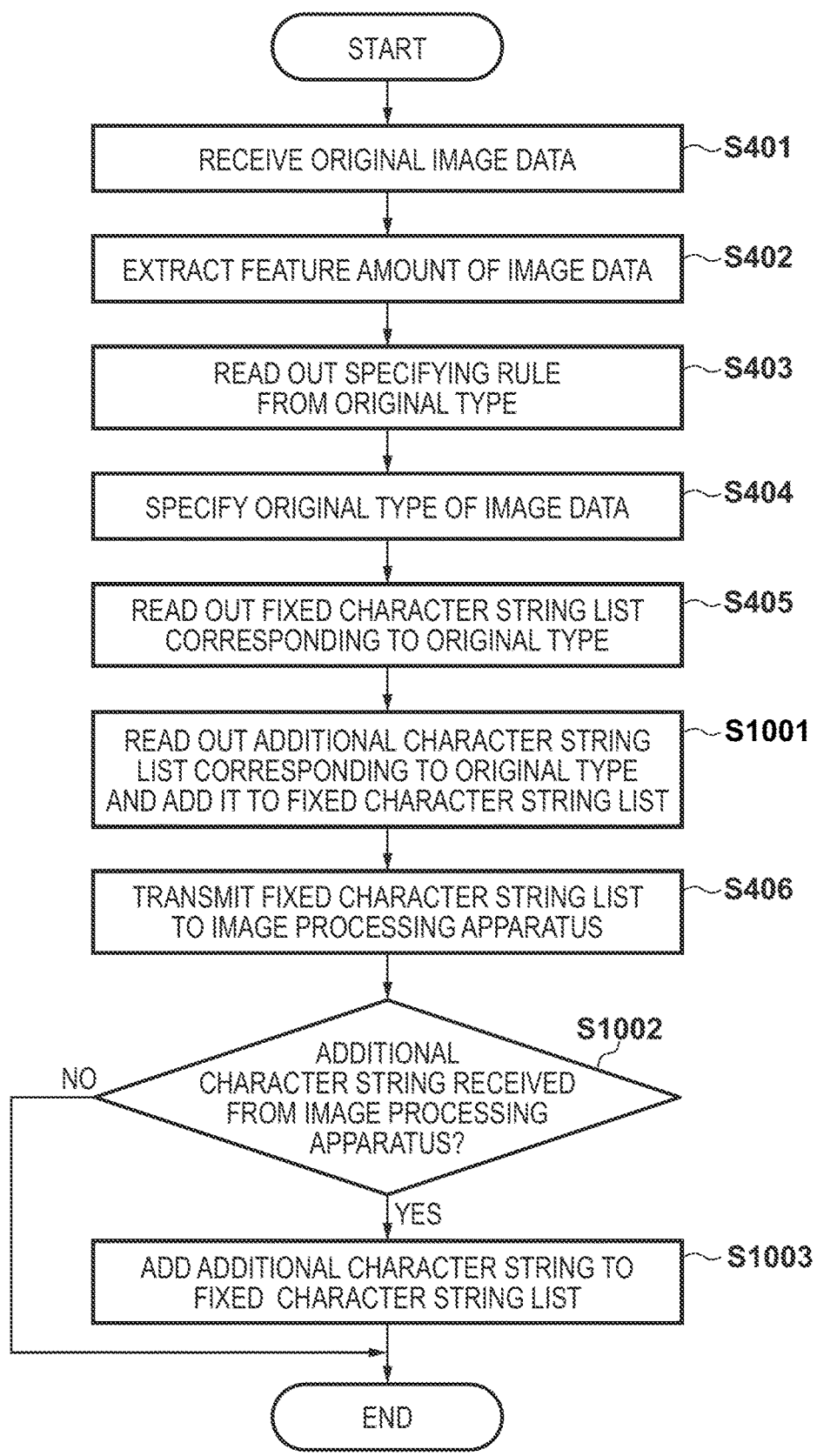
FIG. 10 is a flowchart for describing processing for causing the file naming apparatus of the second embodiment to receive image data of an original from the image processing apparatus and transmit a fixed character string corresponding to the type of original to the image processing apparatus.

FIG. 10 is a flowchart for describing processing for causing the file naming apparatus 120 according to the second embodiment to receive the original image data from the image processing apparatus 100 and transmitting the character string corresponding to its original type to the image processing apparatus 100. Note that in FIG. 10, the same steps as in the flowcharts of FIGS. 4A and 4B denote the same operations, and a description thereof will be omitted. The processing indicated by this flowchart is implemented when a CPU 127 executes a program deployed from a storage unit 129 to a RAM 128. The processing shown in FIG. 10 is started when the image data obtained by reading the original by the image processing apparatus 100 is received from the image processing apparatus 100.

The process advances from step S405 to step S1001 in FIG. 10, and the CPU 127 functions as an original type specifying unit 125. The CPU 127 reads out an additional character string list from the original type specified in step S404. Note that as described with reference to FIG. 17A, if a plurality of additional character string lists are present, the additional character string list of the original type specified based on the predetermined specifying rule is read out. In step S1001, the CPU 127 adds the character string included in the additional character string list to the fixed character string list obtained in step S405, thereby updating the fixed character string list. Note that this fixed character string may be added to the head or end of the list. In this manner, when the CPU 127 updates the fixed character string list, the process advances to step S406, and the fixed character string list is transmitted to the image processing apparatus 100.

The process then advances from step S406 to step S1002, and the CPU 127 functions as the device control unit 122. The CPU 127 determines whether or not the additional character string is received from the image processing apparatus 100. If it is determined that the additional character string is received, the process advances to step S1003; otherwise, this processing ends. In step S1003, the CPU 127 functions as the device control unit 122. The CPU 127 receives the added character string information and updates the additional character string list of the original type specified in step S404. Note that if a plurality of additional character string lists are present, the specified additional character string list is updated based on the predetermined specifying rule.

As described above, the character string newly added by the user is added to the additional character string list of the original type specified based on the feature amount of the image data and is stored. In the subsequent cycles, when the fixed character string list of the same original type is called, the user can similarly use the additional character string list to perform file naming.

As has been described above, according to the second embodiment, a user can use the newly added fixed character string for file naming. In addition, in the subsequent cycles, the added fixed character string can be used for file naming.

In the second embodiment, the character string input by the user is added to the additional character string list. Alternatively, using image data generated upon reading an original by an image reading unit 108, the CPU 105 or 127 may execute character recognition processing and add the character string recognized by an image processing unit 103 to the additional character string list. Accordingly, character strings to be used can be displayed as candidates without causing the user to input, as additional character strings, character strings included in image data obtained by reading the original by the image reading unit 108. For this reason, the user can set a file name by combining character strings included in an original and fixed character strings decided by original type.

Third Embodiment

In the first and second embodiments, the user want to sometimes reduce the load when searching for fixed character strings previously used for file naming. In addition, when the user wants to use the fixed character strings previously used for file naming as the fixed character strings directly for the next file naming, the user wants to omit an operation for selecting the fixed character strings. The third embodiment will described an example coping with this. The third embodiment will be described for part different from the first embodiment. A difference between the first embodiment and the third embodiment to be described below can be similarly added to even the second embodiment and is not limited to only the first embodiment. Note that the arrangements of an image processing apparatus 100 and a file naming apparatus 120 according to the third embodiment and a system including these apparatuses are the same as those of the first embodiment, and a description thereof will be omitted.

The preparation processing flowchart performed before scan shown in FIG. 2 is the same as that of the first embodiment.

FIG. 13 is a flowchart for describing processing by the image processing apparatus 100 according to the third embodiment. This processing is started when a user interface 104 receives an original reading instruction from the user. Note that the processing represented by this flowchart is implemented when a CPU 105 executes a program deployed from a storage unit 107 to a RAM 106. Note that the same steps as in the flowchart of FIG. 3 denote the same operations, and a description thereof will be omitted.

The third embodiment has a different from the first embodiment described with reference to FIGS. 16A and 16B in an original type database 1601.

Figure 17B:
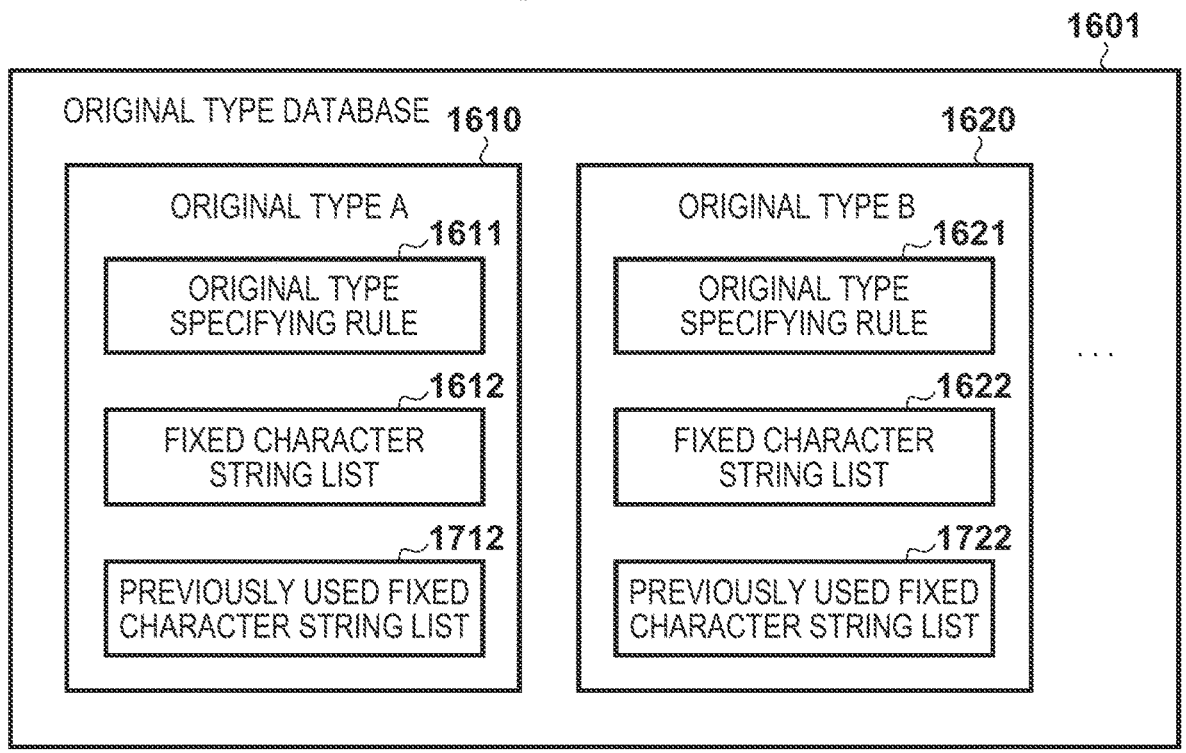
FIG. 17B is a block diagram for explaining an original type database according to the third embodiment.

FIG. 17B depicts a view for explaining the original type database 1601 according to the third embodiment.

In FIG. 17B, previously used fixed character string lists 1712 and 1722 are added to original types 1610 and 1620 of the original type databases 1601 in FIG. 16A. In the descriptions of the flowcharts in FIGS. 13 and 14, the original type database 1601 shown in FIG. 17B is used. Note that the number of previously used fixed character string lists is not limited to one for the original type, as shown in FIG. 17B. As an example, a previously used fixed character string list is created in an original type for each user who uses the file naming apparatus 120, and the previously used fixed character strings may be switched upon user authentication. Alternatively, a plurality of previously used fixed character string lists may be prepared, original type specifying rules may be created in the respective lists, and an original type may be specified using another feature amount in the original type specified by the feature amount of the image data. Note that the respective previously used fixed character string lists need not be limited to exist in the file naming apparatus 120, but may be shared by connection to the plurality of file naming apparatuses 120.

Referring to FIG. 13, when the process advances from step S302 to step S1301, the CPU 105 functions as the device control unit 102. The CPU 105 receives a fixed character string list required for file naming and a previously used fixed character string list from the file naming apparatus 120. This fixed character string list is obtained by causing the file naming apparatus 120 to reorder fixed character strings based on the previously used fixed character string list.

The process then advances to step S1302, and the CPU 105 functions as the device control unit 102. The CPU 105 creates an UI in a state in which file naming is recommended and displays the UI on a display unit 130. In this case, "recommended" means that a file naming system can automatically perform file naming operations to be performed by the user on the UI as described in the first embodiment immediately before a file name is decided.

FIG. 15 depicts a view showing an example of a UI screen displayed on a display unit 110 of the image processing apparatus 100 according to the third embodiment.

As an example, assume that previous file naming is performed in a state of FIG. 6A. In FIG. 6A, fixed character string buttons 502 to 505 are arranged in the order of "order sheet", "template", "processing standby", and "approved". For the file name, the fixed character strings "order sheet" and "processing standby" are used. The file name is given as "order sheet_processing standby".

In FIG. 15, fixed character string buttons 1501 to 1504 are arranged in the order of "order sheet", "processing standby", "template", and "approved". This is because the fixed character strings "order sheet" and "processing standby" are displayed in higher ranks and the file naming apparatus 120 changes the order of the fixed character string buttons 1501 to 1504 in FIG. 6A. In addition, the fixed character string button 1501 having the fixed character string "order sheet" and the fixed character string button 1502 having the fixed character string "processing standby" are set in the selected states from the beginning. In addition, the fixed character string "order sheet" and the fixed character string "processing standby" are displayed in a file name display area 507 in a state in which they are preselected for file naming. In step S1302 of FIG. 13, the state in FIG. 15 is displayed as the initial state on the display unit 110.

After that, when the user presses a file name decision button 508, the process advances to step S305. When the user performs operations described using an example of FIGS. 5A to 6B, these operations are also reflected on the UI even in FIG. 15. Note that a separate operation button may be arranged in the UI of FIG. 15, and a fixed character string list used for the current file naming may not be transmitted to the file naming apparatus 120.

The process then advances from step S305 to step S1303, and the CPU 105 functions as the device control unit 102. The CPU 105 transmits the fixed character strings used for file naming in step S1302 as the used fixed character string list to the file naming apparatus 120 via a network 150. The order of the fixed character strings of the used fixed character string list is that of the fixed character strings used for file naming.

FIG. 14 is a flowchart for describing processing for causing the file naming apparatus 120 of the third embodiment to receive the original image data from the image processing apparatus 100 and transmit the fixed character strings corresponding to the original type to the image processing apparatus 100. Note that the processing represented by this flowchart is implemented when a CPU 127 executes a program deployed from a storage unit 129 to a RAM 128. The processing shown in FIG. 14 is started when the image data obtained by reading the original by the image processing apparatus 100 is received from the image processing apparatus 100. Steps S401 to S404 in FIG. 14 are the same as steps S401 to S404 of FIG. 4A, and a description thereof will be omitted. The process advances from step S404 to step S1401 in FIG. 14, and the CPU 127 functions as an original type specifying unit 125. The CPU 127 reads out the fixed character string list corresponding to the original type specified in step S404 and the previously used fixed character string list. Note that as described with reference to FIG. 17B, if a plurality of previously used fixed character string lists are present, fixed character strings are read out from the previously used fixed character string list specified based on the predetermined specifying rule. The CPU 127 reorders the fixed character strings of the fixed character string list with reference to the previously used fixed character string list. The fixed character strings are reordered such that the fixed character strings included in the previously used fixed character string list at the head of the list. In addition, the fixed character strings arranged at the head of the list are reordered in accordance with the order of the fixed character strings of the previously used fixed character string list. In this manner, when reordering of the fixed character string list is complete, the process advances to step S1402.

In step S1402, the CPU 127 functions as the device control unit 122. The CPU 127 transmits the fixed character string list read out in step S1401 and the previously used fixed character string list to the image processing apparatus 100. The process then advances to step S1403, and the CPU 127 functions as the device control unit 122. The CPU 127 receives the used fixed character string list from the image processing apparatus 100. The process then advances to step S1404, and the CPU 127 functions as an original type specifying unit 125. The CPU 127 updates the previously used fixed character string list of the original type specified in step S404 by using the used fixed character string list received in step S1403. Note that a plurality of previously fixed character string lists are present, the specified previously used fixed character string list is updated based on the predetermined specifying rule.

As described above, the fixed character strings used for file naming by the user are added to the higher ranks in the fixed character string list of the original type specified based on the feature amount of the image data and are stored. When the fixed character string list of the same original type is called in the subsequent cycles, the fixed character string list presented to the user is rearranged such that the previously used fixed character strings are ordered in higher ranks. The UI initial state is displayed in a file naming state in which the previously used fixed character strings are selected.

As has been described above, according to the third embodiment, the user can easily find fixed character strings used for previous file naming. In addition, since the UI initial state is displayed in a state in which the previously used fixed character strings are selected, file naming can be performed by omitting the selection operation of the fixed character strings when the same file naming as the previous one is performed.

Other Embodiments

In the first embodiment to the third embodiment, different character strings are determined as candidates for a file name. A word shared by a plurality of original types may be used. Alternatively, the image processing apparatus 100 or the file naming apparatus 120 may store the database of character strings used as the candidates of a file name, and character strings corresponding to an original type out of the character strings stored in the database may be displayed on the display unit 110.

According to the embodiments of the present invention, an original type can be specified from the image data of the original, and the file name of the image data can be decided from the candidate character strings for a file name corresponding to the original type. Therefore, the user can perform intended file naming with a light load.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-014517, filed Jan. 30, 2017, which is hereby incorporated by reference herein in its entirety.

What is claimed is:

1. An image processing apparatus comprising:
one or more memories; and
one or more processors that execute a set of instructions to:
register a plurality of types of an original and a plurality of character strings, wherein each respective type of the original of the plurality of tunes of the original is associated with respective one or more character strings of the first plurality of character strings, and wherein each of the associated respective one or more character strings includes at least one character string that indicates a status for the respective type of the original;
obtain image data of the original;
specify a type of the original based on the obtained image data;
provide, on a display unit, a setting screen for setting a name of the image data, wherein the setting screen includes a plurality of buttons corresponding to a second plurality of character strings that are a candidate of a character string used for a name of the image data, the second plurality of character strings corresponding to, in a case where the specified type of the original is a first toe of the original, the respective one or more character strings that are registered in association with the first type of the original, and, in a case where the specified type of the original is a second type of the original, the respective one or more character strings that are registered in association with the second type of the original;
select at least one button of the plurality of buttons in accordance with a user operation on the setting screen; and
set a name of the image data by using character strings corresponding to the at least one selected button.

2. A method of controlling an image processing apparatus, comprising:
registering a plurality of types of an original and a first plurality of character strings, wherein each respective type of the original of the plurality of types of the original is associated with respective one or more character strings of the first plurality of character strings, and wherein each of the associated respective one or more character strings includes at least one character string that indicates a status for the respective type of the original;
obtaining image data of the original;
specifying a type of the original based on the obtained image data;
providing, on a display unit, a setting screen for setting a name of the image data, wherein the setting screen includes a plurality of buttons corresponding to a second plurality of character strings that are a candidate of a character string used for a name of the image data, the second plurality of character strings corresponding to, in a case where the specified type of the original is a first toe of the original, the respective one or more character strings that are registered in association with the first type of the origin and, in a case where the specified type of the original is a second tune of the original, the respective one or more character strings that are registered in association with second type of the original;

selecting at least one button of the plurality of buttons in accordance with a user operation on the setting screen; and setting a name of the image data by using character strings corresponding to the at least one selected button.

3. The method according to claim 2, further comprising: executing character recognition processing for the image data, wherein a character string recognized by the character recognition processing is displayed as the candidate of a character string used for the name of the image data in the setting screen.

4. The method according to claim 3, wherein the candidate of the character string used for the name of the image data includes at least one character string included in the image data.

5. The method according to claim 2, wherein the image data of the original is obtained by reading the original with a reader.

6. The method according to claim 2, further comprising:

accepting a candidate character string used for the name of the image data from a user; and registering the type of the original and the accepted candidate character string, as one character string of the first plurality of character strings, in association with each other.

7. The method according to claim 6, wherein a character string used for the name of the image data out of candidates of the character strings and the type of the original are stored in association with each other, and wherein the used character string stored in association with an original of the same type of the image data is displayed at a higher rank in a list of a candidate character string used for the name of obtained image data in the setting screen.

8. The method according to claim 2, further comprising:

extracting a feature of the obtained image data, wherein, in the specifying the type of the original the type of the original is specified based on the extracted feature of the image data.

9. The method according to claim 2, wherein the second plurality of character strings include character strings that are able to be set as a file name by combining two or more character strings of the second plurality of character strings in accordance with a user operation.

10. The method according to claim 2, further including selecting at least two buttons of the plurality of buttons in accordance with the user operation on the setting screen, wherein the character strings corresponding to the selected at least two buttons are arranged in the name of the image data in order of selections of the at least two buttons.

11. The method according to claim 2, wherein the registered first plurality of character strings includes a character string that is not included in the original.

12. The method according to claim 2, wherein, in the selecting, at least two buttons of the plurality of buttons are selected on the setting screen, and wherein, in the setting, the name of the image data is set using the selected at least two buttons.

13. The method according to claim 2, further comprising:

providing a character string set for the name of the image data on the setting screen.

14. The method according to claim 2, wherein the setting screen further includes the obtained image data.

15. A non-transitory computer-readable storage medium storing a program for causing a computer to execute a method of controlling an image processing apparatus, the method comprising:

registering a plurality of types of an original and a first plurality of character strings, wherein each respective type of the original of the plurality of types of the original is associated with respective one or more character strings of the first plurality of character strings, and wherein each of the associated respective one or more character strings includes at least one character string that indicates a status for the respective type of the original;

obtaining image data of the original;

specifying a type of the original based on the obtained image data;

providing, on a display unit, a setting screen for setting a name of the image data, wherein the setting screen includes a plurality of buttons corresponding to a second plurality of character strings that are a candidate of a character string used for a name of the image data, the second plurality of character strings corresponding to, in a case where the specified type of the original is a first type of the original, the respective one or more character strings that are registered in association with the first type of the origin and, in a case where the specified type of the original is a second type of the original, the respective one or more character strings that are registered in association with the second type of the original;

selecting at least one button of the plurality of buttons in accordance with a user operation on the setting screen; and setting a name of the image data by using character strings corresponding to the at least one selected button.

* * * * *